March 15, 1966     H. S. HEMSTREET     3,240,120
APPARATUS FOR ALTERING THE APPARENT PERSPECTIVE OF IMAGES
Original Filed Nov. 25, 1955     11 Sheets-Sheet 1

HAROLD S. HEMSTREET
INVENTOR

BY *Richard G. Stephens*
ATTORNEY

HAROLD S. HEMSTREET
INVENTOR

BY Richard G. Stephens
ATTORNEY

March 15, 1966  H. S. HEMSTREET  3,240,120
APPARATUS FOR ALTERING THE APPARENT PERSPECTIVE OF IMAGES
Original Filed Nov. 25, 1955  11 Sheets-Sheet 3

HAROLD S. HEMSTREET
INVENTOR

BY *Richard D. Stephens*
ATTORNEY

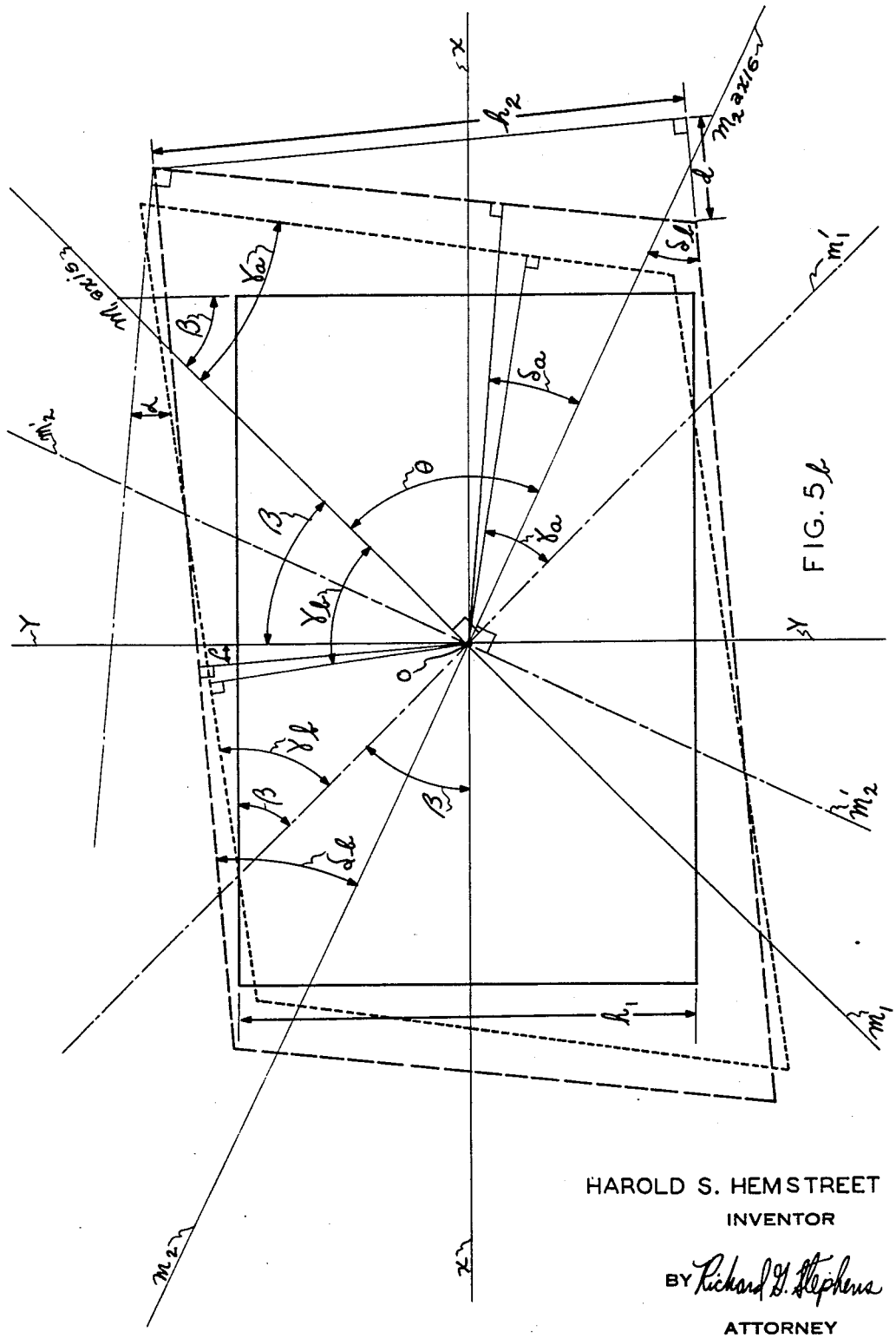

March 15, 1966         H. S. HEMSTREET         3,240,120

APPARATUS FOR ALTERING THE APPARENT PERSPECTIVE OF IMAGES

Original Filed Nov. 25, 1955         11 Sheets-Sheet 6

HAROLD S. HEMSTREET
INVENTOR

BY *Richard D. Stephens*
ATTORNEY

HAROLD S. HEMSTREET
INVENTOR

BY Richard G. Stephens
ATTORNEY

March 15, 1966   H. S. HEMSTREET   3,240,120
APPARATUS FOR ALTERING THE APPARENT PERSPECTIVE OF IMAGES
Original Filed Nov. 25, 1955   11 Sheets-Sheet 8

HAROLD S. HEMSTREET
INVENTOR

March 15, 1966 H. S. HEMSTREET 3,240,120
APPARATUS FOR ALTERING THE APPARENT PERSPECTIVE OF IMAGES
Original Filed Nov. 25, 1955 11 Sheets-Sheet 10

HAROLD S. HEMSTREET
INVENTOR

BY *Richard G. Stephens*
ATTORNEY

HAROLD S. HEMSTREET
INVENTOR

United States Patent Office 3,240,120
Patented Mar. 15, 1966

3,240,120
APPARATUS FOR ALTERING THE APPARENT
PERSPECTIVE OF IMAGES
Harold S. Hemstreet, Wilton, Conn., assignor to General
Precision, Inc., a corporation of Delaware
Continuation of application Ser. No. 548,841, Nov. 25,
1955. This application Oct. 30, 1961, Ser. No. 155,227
25 Claims. (Cl. 88—57)

This invention relates to apparatus for altering the apparent perspective of planar images, and is a continuation of my copending application Serial Number 548,841, filed November 25, 1955, now abandoned, which is a continuation-in-part of my copending applications Serial Number 480,033, filed January 5, 1955, now Patent No. 2,999,322, Serial Number 500,325, filed April 11, 1955, now Patent No. 3,101,645, and Serial Number 503,211, filed April 22, 1955, now Patent No. 2,975,670. In these copending applications and in copending application Serial Number 548,842, filed on even date herewith, now Patent No. 3,015,988, and entitled Perspective Alteration Means and Method I have shown various methods and means by which images having the appearance of plane areas as viewed from particular viewpoints may be altered to provide images having the appearance of the same areas as viewed from different angles, or at displaced viewpoints. Method and apparatus capable of such image alteration is of considerable use in numerous applications, including, for example, apparatus for producing realistic visual displays for use in grounded training equipment, apparatus for slanting lettering, designs and drawings to produce unique effects, and apparatus for use in conjunction with camera or film printer equipment to provide film having the appearance of having been taken from a remote or inaccessible location.

My copending application Serial Number 500,325, filed April 11, 1955, for "Simulated Viewpoint Displacement Method and Apparatus," now Patent No. 3,101,645, illustrates in detail method and apparatus for altering the apparent perspective of images by varying the images anamorphically different amounts in two perpendicular directions, and a preferred embodiment of the invention of the above-mentioned copending application shows apparatus comprising a pair of perpendicularly operating variable power anamorphosers. Since fixed power anamorphosers may be constructed at less cost and optical assemblies using fixed power anamorphosers may be constructed at less cost and operated by simpler mechanical apparatus, it becomes desirable to provide image alteration method and apparatus utilizing constant anamorphic magnification as much as possible in lieu of variable anamorphic magnification. Furthermore, while the above-mentioned copending application shows a system in which both anamorphic image alteration means are rotatable as a unit about the system optical axis, it becomes desirable to provide comparable method and apparatus in which the pair of anamorphic means are independently rotatable. Generally speaking, one who builds perspective alteration apparatus finds particular systems advantageous in particular applications, and the availability of number of differing systems greatly facilitates the design of a commercially desirable product.

I have discovered that by providing two primitive transformations of an image with selected powers and in selected directions, that the apparent perspective of the image may be altered. I have developed a plurality of systems in accordance with that discovery, so that the benefits of being able to maintain the power or angle of a particular primitive transformation means always at the same value regardless of desired change in perspective may be utilized.

It is therefore a primary object of the invention to provide apparatus for altering the apparent perspective of planar images by means of two primitive transformation devices.

It is a further object of the invention to provide apparatus of the above nature in which either the power or the direction of any one of the primitive transformation devices is maintained constant at a desired value.

It is an additional object of the invention to provide apparatus of the above nature in which the power of either of the primitive transformation devices is maintained constant at a desired value.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIGS. 5a and 5b are gometrical diagrams useful in understanding the capability of two primitive transformations such as those provided by two anamorphosers to alter the apparent perspective of an image.

Figure 6:
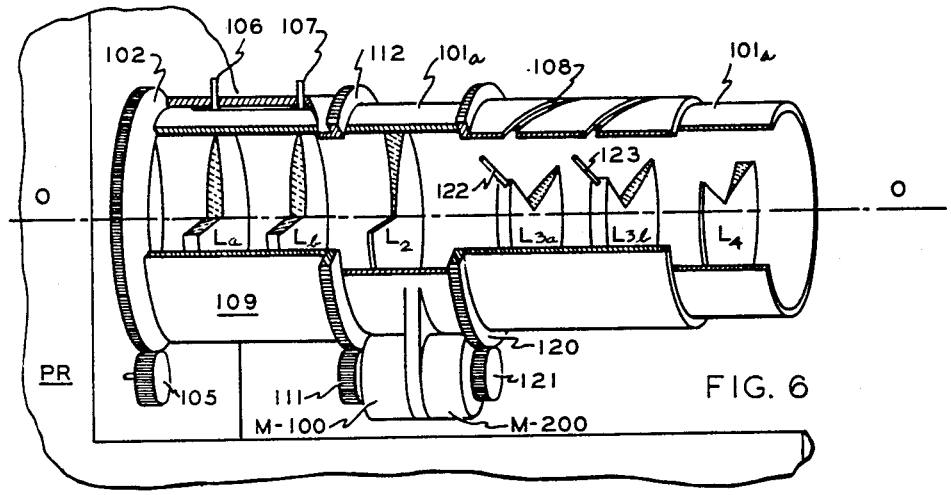

FIG. 6 shows in perspective with certain parts partially cut away a specific optical embodiment of the invention utilizing two variable power anamorphosers, each of which are independently variable in power but which have their axes of variable magnification aligned at a certain fixed angle with respect to each other. In the specification the apparatus of FIG. 6 is designated as a Type I system. Reference may also be had to my copending application Serial Number 500,325 which illustrates a particular species of Type I system.

Figure 7:
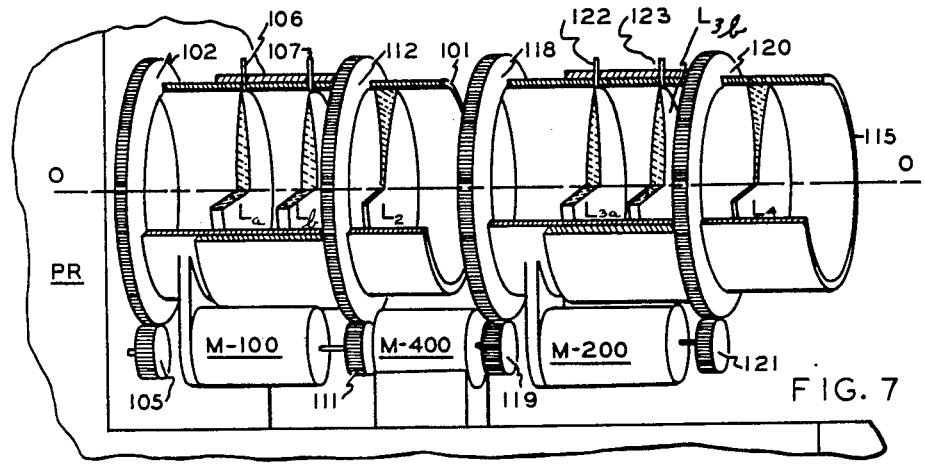

FIG. 7 shows in perspective with certain parts partially cut away an optical embodiment of the invention utilizing two anamorphosers each variable both in power and in angular orientation, which are controlled in accordance with an arbitrary restrain. In the specification the apparatus of FIG. 7 is designated as a Type V system.

Figure 8:
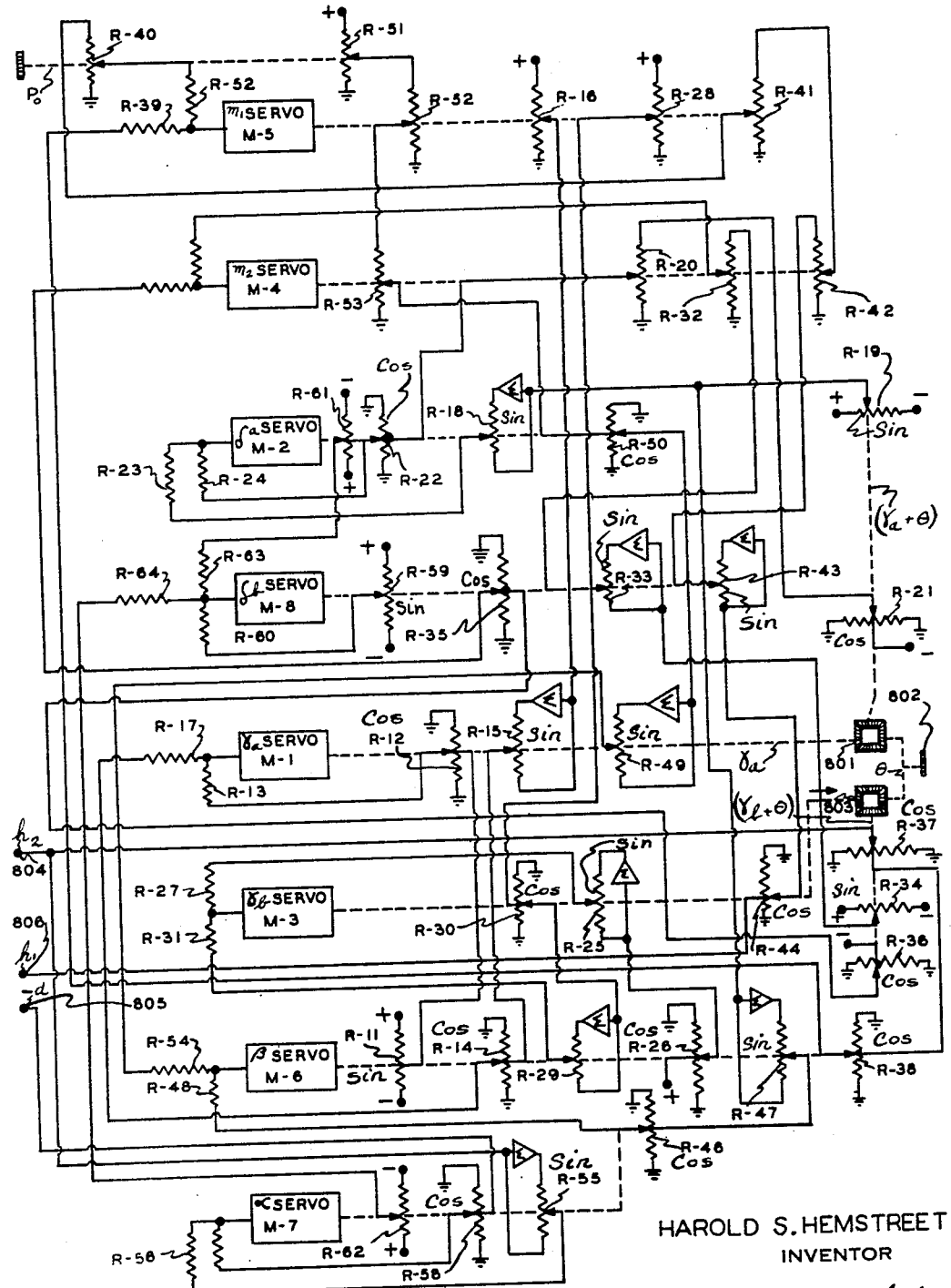

FIG. 8 is an electrical schematic diagram of an exemplary controller which may be utilized to operate a Type I system of the invention such as shown in FIG. 6.

Figure 9:
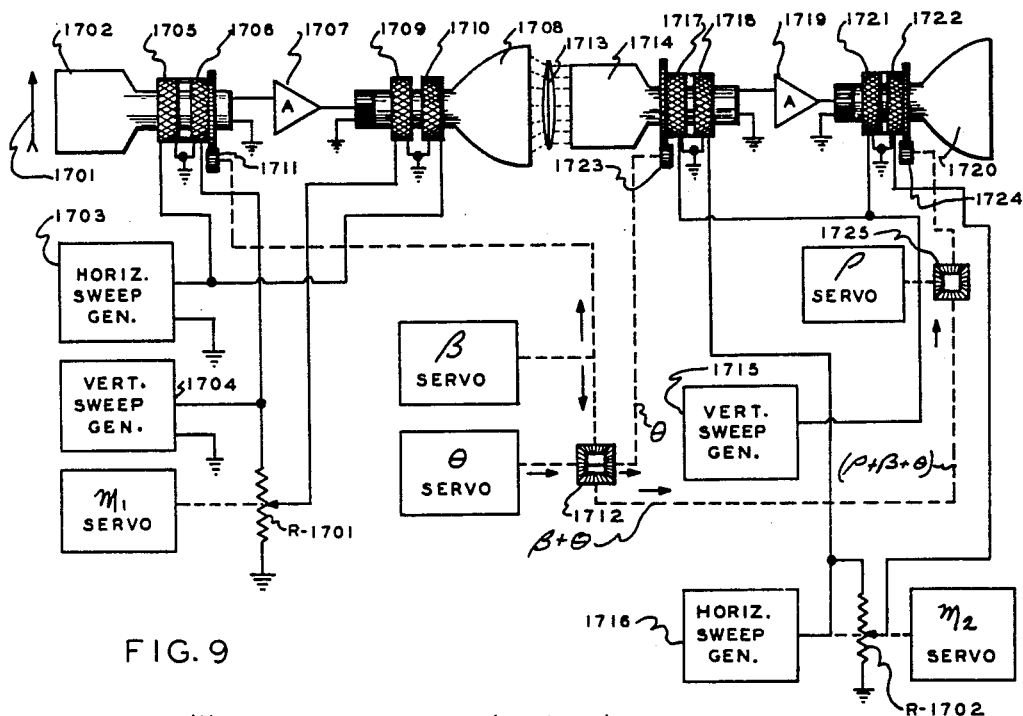

FIG. 9 is an electro-mechanical schematic diagram illustrating television apparatus which may be used in practicing the method of the invention electrically rather than optically.

Figure 10:
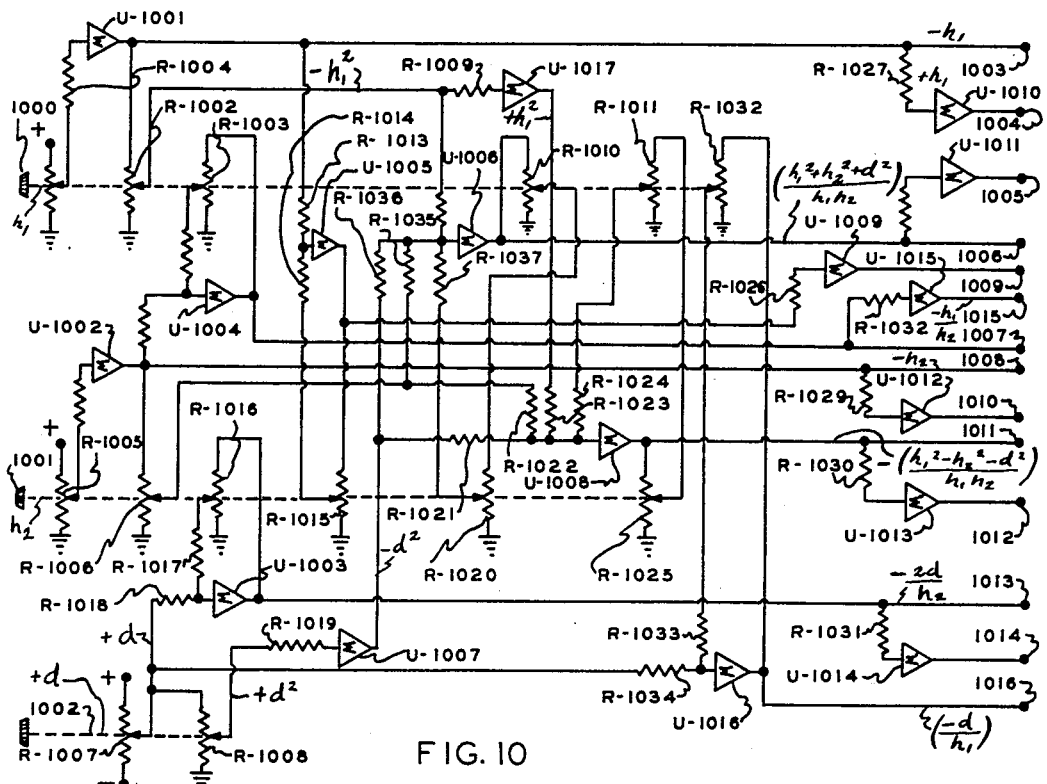

FIG. 10 is an electrical schematic diagram illustrating the exemplary apparatus which may be utilized to receive input quantities commensurate with desired perspective alteration of an image and to provide output potentials for use in controlling apparatus shown in FIGS. 11 through 16.

Figure 11:
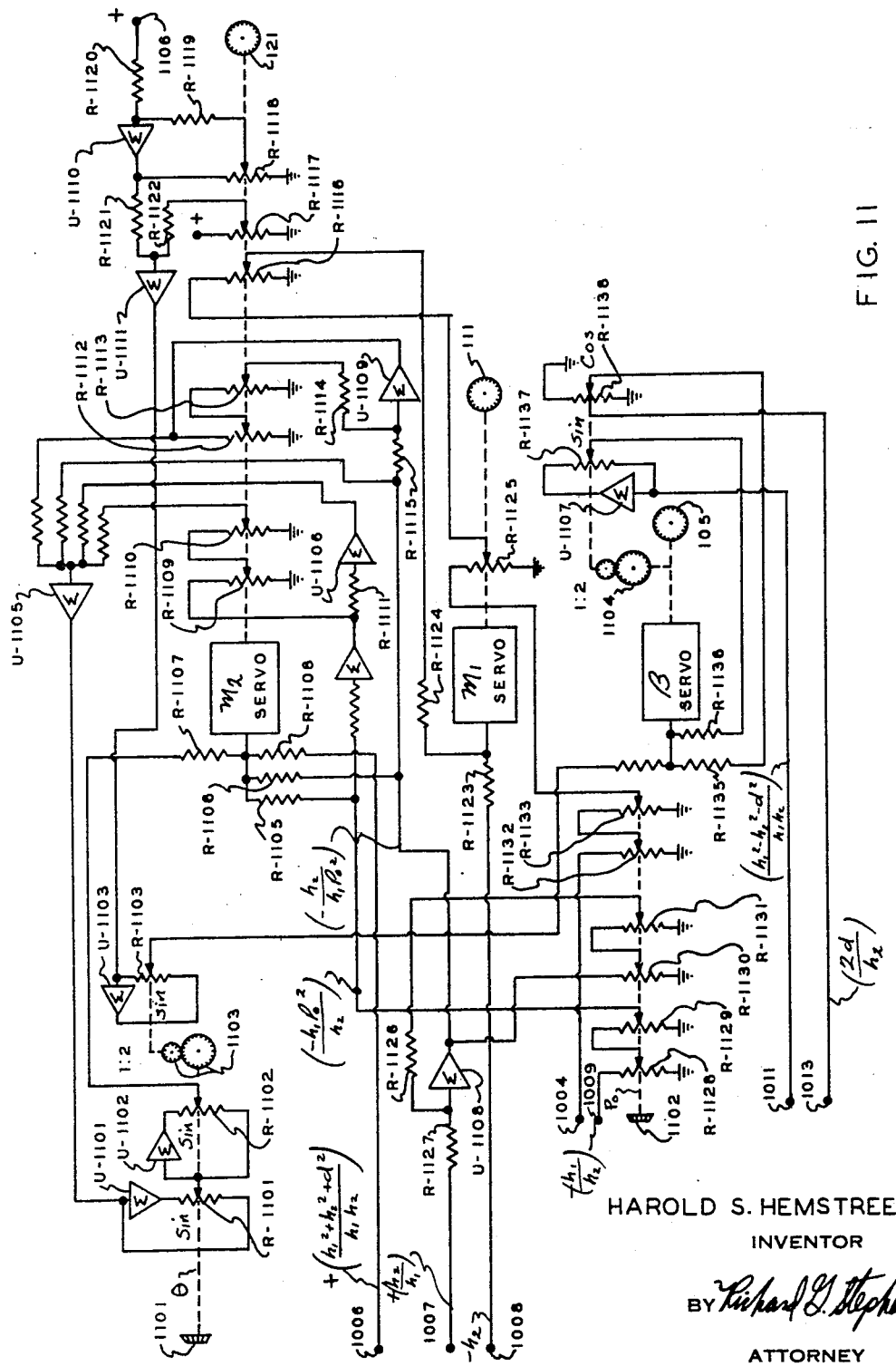

FIG. 11 is an electrical-schematic diagram of an exemplary computer controller which may be used to operate a Type I system of the invention such as is shown in FIG. 6.

Figure 3:
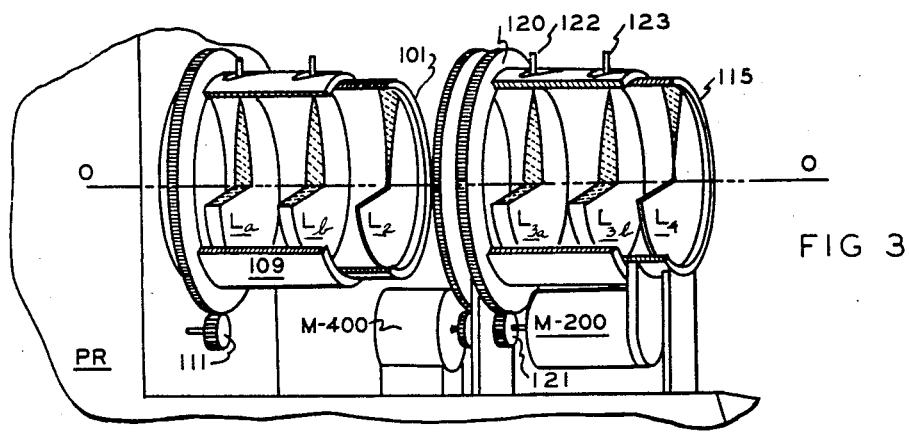
FIG. 3 shows in perspective with certain parts partially cut away an alternative optical embodiment of the invention utilizing a pair of variable power anamorphosers. In the specification the apparatus of FIG. 3 is designated as a Type II system.
Figure 12:
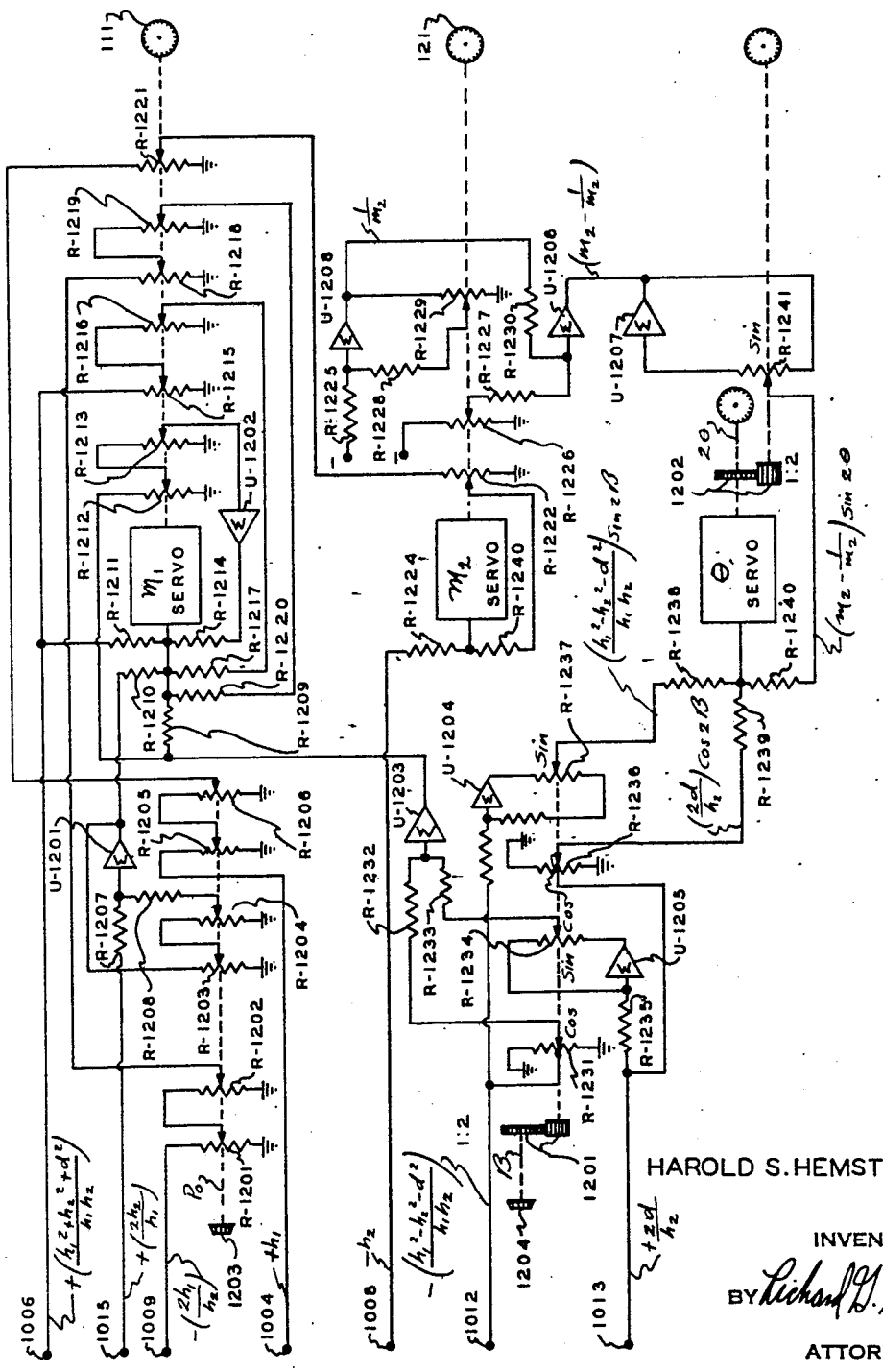

FIG. 12 is an electrical schematic diagram of an exemplary computer controller which may be used to operate a Type II system of the invention such as is shown in FIG. 3.

Figure 1:
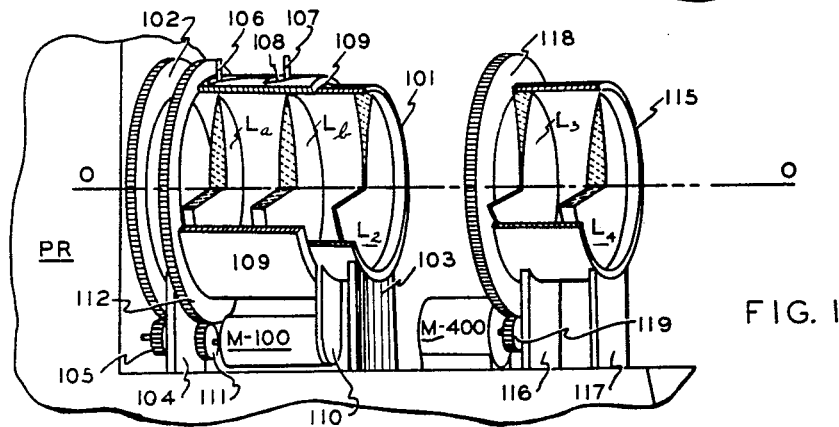
FIG. 1 shows in perspective with certain parts partially cut away a specific optical embodiment of the invention utilizing one fixed power anamorphoser and one variable power anamorphoser. In the specification the apparatus of FIG. 1 is designated as a Type III system.
Figure 13:
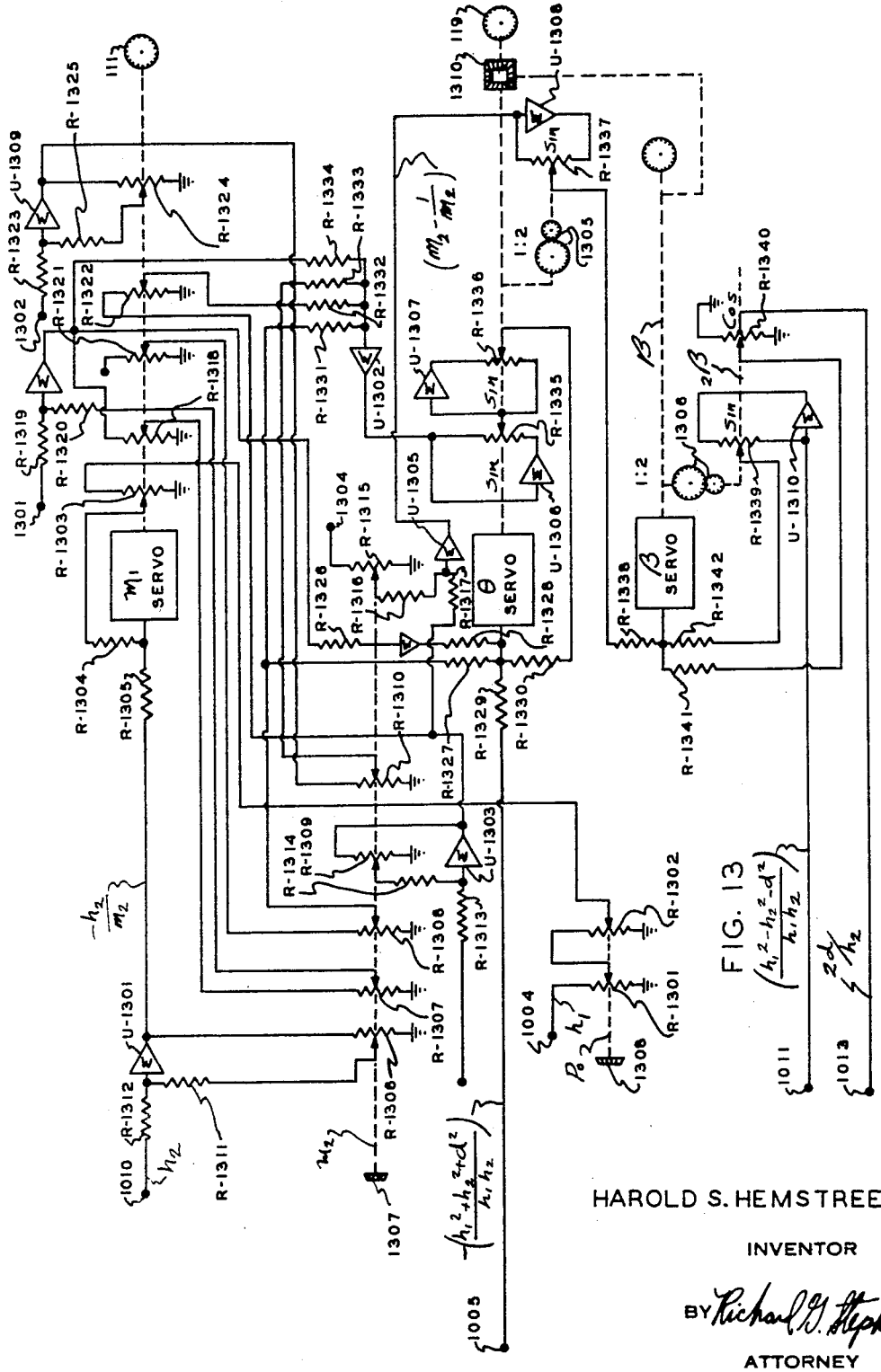

FIG. 13 is an electrical schematic diagram of an exemplary computer controller which may be used to operate a Type III system of the invention such as is shown in FIG. 1.

Figure 2:
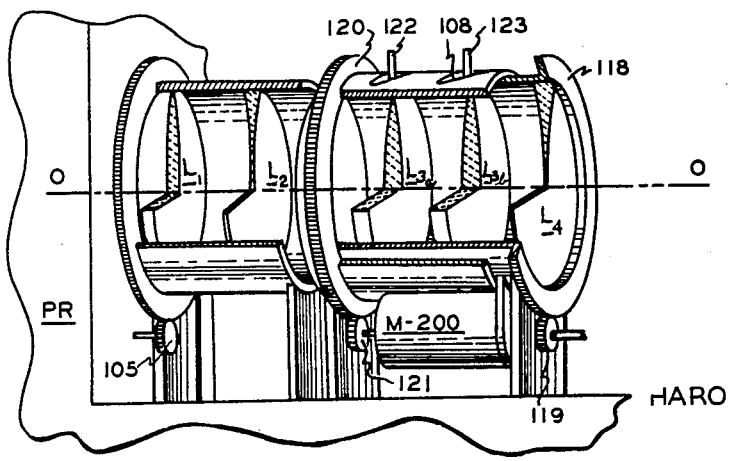
FIG. 2 shows in perspective with certain parts partially cut away an alternative optical embodiment of the invention using one fixed power anamorphoser and one variable power anamorphoser. In the specification the apparatus of FIG. 2 is designated as a Type IV system.
Figure 14:
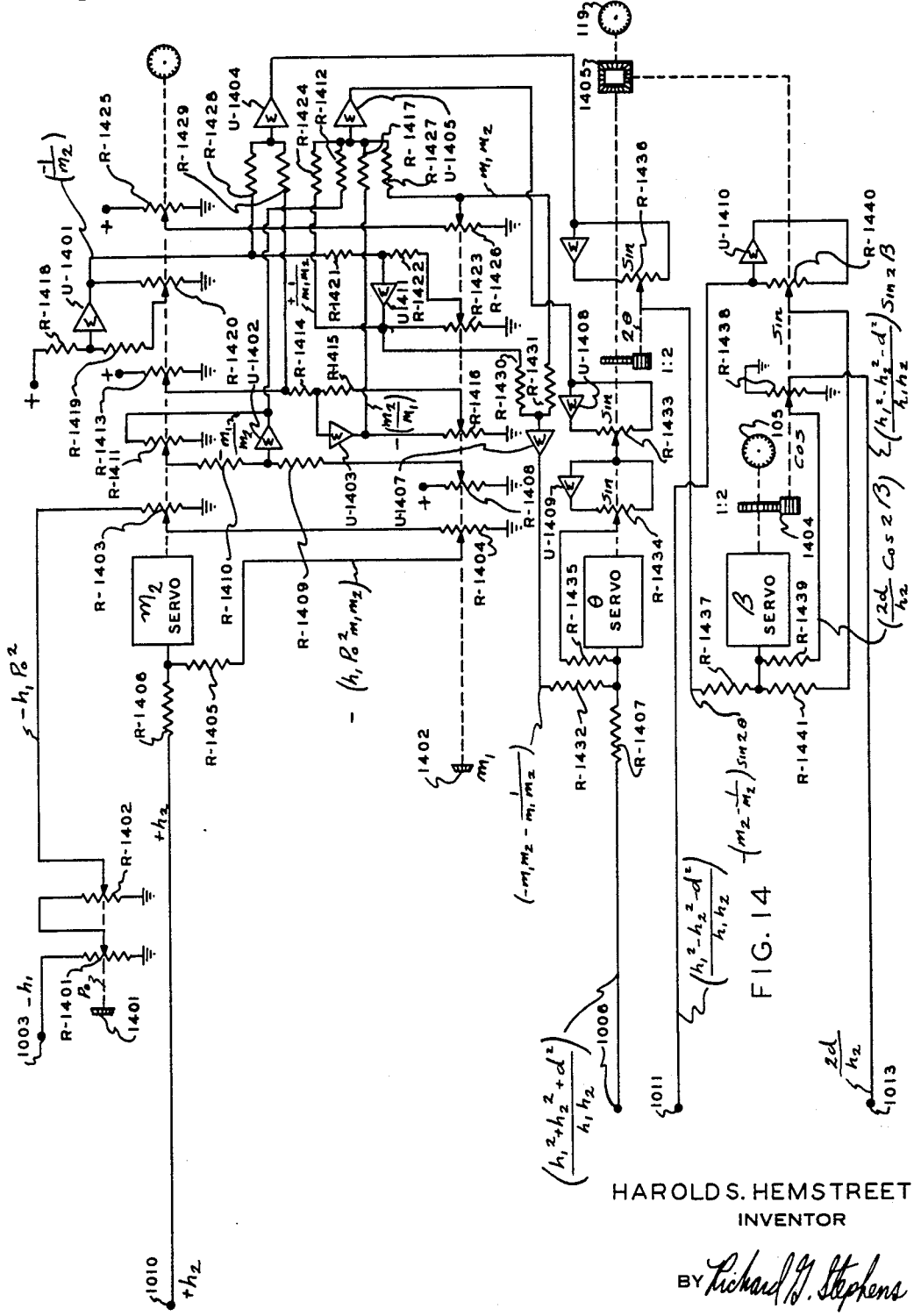

FIG. 14 is an electrical schematic diagram of an exemplary computer controller which may be used to operate a Type IV system of the invention such as is shown in FIG. 2.

Figure 15:
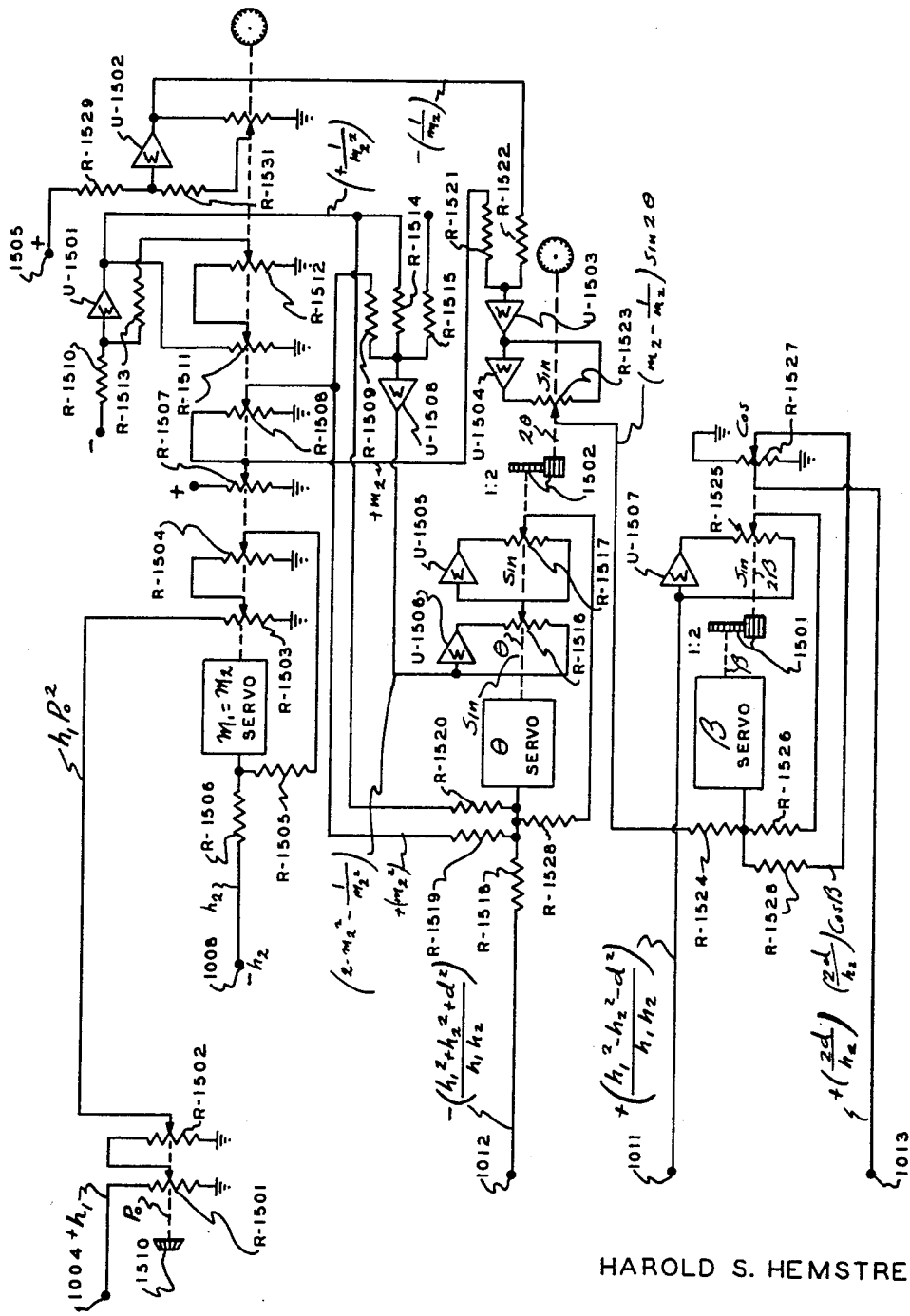

FIG. 15 is an electrical schematic diagram of an exemplary control computer which may be used to operate a Type V system of the invention such as is shown in FIG. 7.

Figure 16:
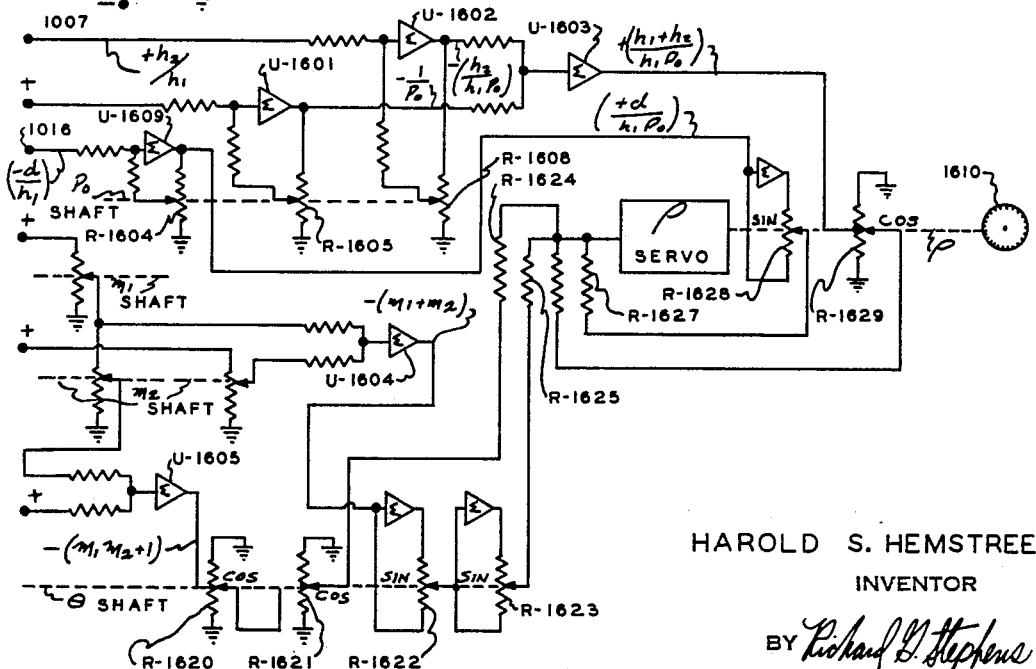

FIG. 16 is an electrical schematic diagram of a controller which may be utilized in conjunction with any of the other controllers shown to provide a counter-rotation so as to maintain line-at-infinity portions of perspectively altered images parallel.

Figure 4A:
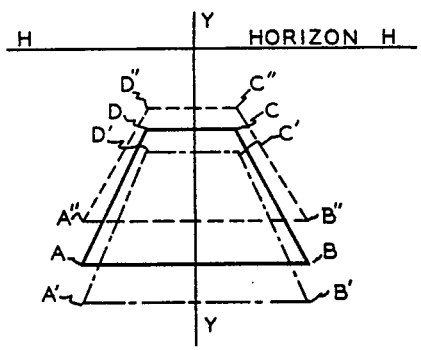
FIGS. 4a through 4d are geometrical diagrams useful in understanding the nature of perspective alteration or viewpoint displacement of an image.
Figure 4B:
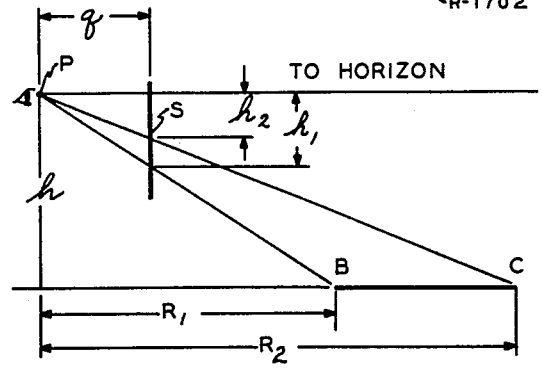

Shown in heavy lines in FIG. 4a is a trapezoidal or keystone-shaped area ABCD such as the appearance a rectangular surface might present when viewed in perspective at a point situated at a particular place in line with the centerline Y—Y of the surface. From a position higher in altitude than the initial viewpoint, the area might have an appearance such as trapezoid A'B'C'D', and when viewed from a position lower in altitude than the initial viewpoint, the area might have an appearance such as trapezoid A"B"C"D". In FIG. 4a line H—H represents the horizon or line at infinity. Shown in FIG. 4b is a side elevation view showing an eye situated at point P viewing a rectangular surface at an altitude $h$ above said surface, the side BC of said surface being shown as a heavy line. It will be seen that if a screen S is placed a distance $q$ in front of viewpoint P, that a replica of the actual scene viewed from viewpoint P may be simulated by presentation of a proper scene on screen S for observation from point P. Assuming that screen S is mounted in a generally vertical position as shown, it may be seen that in order to effectuate a realistic presentation, that the distances of objects below the horizon line on screen S must be inversely proportional to the actual horizontal distance between these points and the ground position of the viewpoint. For example, the distance $h_1$ on screen S between the horizon and the simulated near end AB of the surface must be inversely proportional to $R_1$, the horizontal distance between view point P and the actual near end AB of the grounded surface, or as may be seen by similar triangles:

$$h_1 = h\frac{q}{R_1}$$

Similarly, the distance $h_2$ on screen S between the horizon and the simulated far end CD of the rectangular surface is inversely proportional to $R_2$, the horizontal distance between viewpoint P and the actual distance to the far end of the rectangular surface, or that:

$$h_2 = \frac{q}{R_2}$$

It may now be appreciated that for proper presentation of a scene simulating a surface seen in perspective, that increases in viewpoint altitude require proportionate increases in distances $h_1$ and $h_2$ of such a scene, and that conversely, decreases in viewpoint altitude require proportionate decreases in distances $h_1$ and $h_2$ of such a scene. Hence if a photograph were taken of a scene at a particular viewpoint, an appropriate stretching or squeezing of the image from such photograph with respect to the horizon would yield scenes such as those viewed at points above and below the point where the picture was taken in the same plane as that in which the photograph was taken.

Figure 4C:
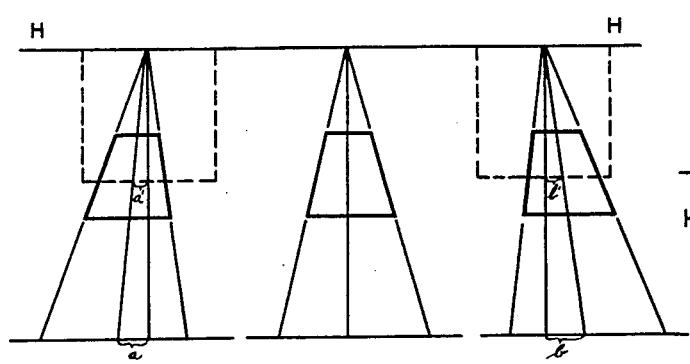

Shown in FIG. 4c are the appearances which a rectangular surface might have when viewed from three viewpoints of the same altitude but varying in lateral position with respect to the surface. The center portion of FIG. 4c illustrates the scene which might be viewed from a viewpoint located on the longitudinal centerline of the surface. The left-hand portion of FIG. 4c illustrates the same surface viewed from a location located a distance $a$ to the right of the centerline of the surface, and the right-hand portion of FIG. 4c illustrates the same surface viewed from a viewpoint located a distance $b$ to the left of the centerline of the surface. Superimposed upon each portion of FIG. 4c in dashed lines is a rectangle which may represent a photographic slide which might be used to project a simulated scene. It may be seen that the displacements $a'$ and $b'$ of the centerline on the slide at the lower edge of the frame are proportional to the ratio of the lateral displacement of the viewpoint to altitude of the viewpoint. If pictures were taken so that the horizon in each picture would be located along the upper edge of the frame, then the lateral displacement of any point in the picture from its position in the center portion of FIG. 4c is proportional to the distance from the point to the top of the frame. Thus it may be seen that by providing "distortion" of an image varying in accordance with the magnitude of lateral viewpoint displacement from a reference viewpoint and varying linearly from zero distortion at the line at infinity or horizon to maximum distortion at a nearest location, that scenes varying in accordance with lateral displacement of a viewpoint may be produced. I have designated such distortion as "shear distortion" since it produces a shape similar to those produced by applying shear forces to an elastic member. Now it should be understood that by stretching or squeezing an image of an area with respect to its line at infinity or horizon, and by shearing the image linearly as described above, images may be altered to provide resulting images which have a different center of perspective located in the plane of the original viewpoint. The "plane" of the original viewpoint may be seen to be the plane passing through the viewpoint which is perpendicular in two directions from the line-of-sight of the original viewpoint. The distortion required to simulate viewpoint displacement is explained in a slightly different manner in my copending application Serial No. 511,488. Although the above explanation is given principally in terms of an outdoor scene in which the line at infinity is the actual horizon, it should be noted that the theory applies quite as readily to all other images of perspective views, and the terms "vertical" and "horizontal" are therefore used broadly.

Figure 4D:
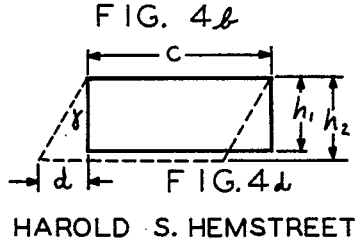

Assume that the rectangle of FIG. 4d represents an image of a surface as viewed from an original viewpoint, such as the image which might be formed by photographing the surface from the original viewpoint. Let the upper edge of the rectangle represent the horizon or line at infinity of the image. If the original image is compressed or squeezed and sheared in accordance with the rules given above for a viewpoint displacement, it will result in a parallelogram image having a new height and a slope, perhaps as shown by the parallelogram of FIG. 4d. For producing distortion to simulate a given viewpoint displacement, three relationships between the undistorted image (rectangle) and the distorted image (parallelogram) may be determined: (1) the ratio of heights, $h_2$ to $h_1$; (2) the slope angle $\alpha$; and (3) the fact that the horizon dimension ($c$ in FIG. 4d) remains constant.

Figure 5A:
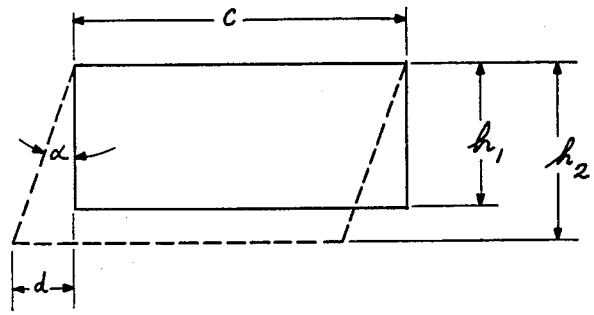

Assume that an image of an area or a portion of an image of an area is represented by the rectangle of FIG. 5a. As shown in the figure, the rectangle has a height of $h_1$ and a width C. It will be apparent from the explanation given above in connection with FIG. 4, that vertical expansion of the image to a new height $h_2$ and shearing of the image laterally in an amount proportional to the distance $d$ would provide an image having the shape of the parallelogram of FIG. 5a, and that such parallelogram image would represent the original area as viewed from a new viewpoint. If the upper line of the rectangle of FIG. 5a is assumed to represent a line at infinity or horizon of the original image, it will be understood that the upper line of the parallelogram should coincide with the upper line of the rectangle, since things viewed at infinity do not appear in different locations nor with different sizes when viewed from various viewpoints.

FIG. 5b shows the original rectangular image portion and also parallelogram images which may be produced by means of two co-axial anamorphosers acting on the original image. In FIG. 5b point O represents the axis of an optical system containing a pair of anamorphosers. The first anamorphoser is rotated about the optical axis O so that its direction of anamorphic power ($m_1$ axis in FIG. 5b) is at an angle $\beta$ from a reference axis Y—Y of the original image, and the anamorphoser may have unity power in a direction perpendicular to the $m_1$ axis, or along $m_1'$ in FIG. 5b. The effect of the first anamorphoser will be to produce a parallelogram image such as that shown in dotted lines in FIG. 5b. The parallelogram may be constructed from the original rectangle by lengthening the rectangle in all dimensions parallel to the $m_1$ axis by an amount proportional to the power of the first anamorphoser while maintaining all dimensions perpendicular to the $m_1$ axis at their original length. In terms of analytic geometry, such alteration of a figure is termed a "primitive transformation." The second anamorphoser is rotated about the system axis O so that its direction of anamorphic power ($m_2$ axis of FIG. 5b) is at an angle $\theta$ from the $m_1$ axis. The effect of the second anamorphoser will be to act on the image represented by the intermediate parallelogram shown in dotted lines to provide an image such as the resultant parallelogram shown in dashed lines. The resultant parallelogram may be constructed from the intermediate parallelogram by varying each dimension of the intermediate parallelogram along the $m_2$ axis by the power of the second anamorphoser, while maintaining dimensions perpendicular to the $m_2$ axis (or along the $m_2'$ axis) at the same length, or, in effect, making a second "primitive transformation." It will be apparent that the size and shape of the resultant parallelogram will depend upon the powers of each anamorphoser and their angular orientations. While the upper lines of the original rectangle and the resultant parallelogram have not been shown as being of the same length, it will be apparent that if correct powers and angular orientations were selected, that those dimensions could be made to be of the same length, and in analysis of FIG. 5b such equality will be assumed. If it be assumed that the original or rectangle image portion is produced by means of a film frame or similar object, axis Y—Y of FIG. 5b may represent, for example, the vertical direction in the projected image, and axis X—X may represent the horizontal direction.

The effect of the two anamorphosers on the original rectangle image provides a rotation of the image as well as shearing and compression. As shown in FIG. 5b the amount of such rotation is indicated by the angle $\rho$. It will be seen that if one wishes to maintain infinite distance or horizon line portions of images in a fixed location on a screen or other surface, that the resultant trapezoidal or distorted image must be rotated through the angle $\rho$ to compensate for the rotation which occurs as an incident to expansion and shearing. If the image to be altered in perspective is to be cast upon a fixed screen, the object utilized to produce the original image may be counter-rotated through an angle equal to $\rho$, or in systems utilizing a rotatable screen or other surface, the screen may be rotated relative to the object. The former system is deemed preferable for grounded training visual displays, but the latter system is quite acceptable for photographic slanting and other uses where continuous projection is not necessary and where actual orientation in space is unimportant. In systems not requiring a large angular field, the required counter-rotation of the image may be effected by means of rotatable Dove prisms, in a manner which will be apparent to those skilled in the art.

It will become apparent from inspection of FIG. 5b that mere rotation of the resultant parallelogram through the angle $\rho$ will not cause the upper lines of the parallelogram and rectangle to coincide, but that the parallelogram would also have to be shifted vertically and laterally. The amount of shifting required depends upon the distance between optical axis O and the portions of the original image representing the horizon or line at infinity. It will be apparent to those skilled in the art that if the horizon or infinite distance portion of the image were to lie on optical axis O, that such portion would not be displaced from the axis in the resultant parallelogram image, since axial light rays remain undeviated in a coaxial lens system. Therefore, if the original image is produced, for example, from a film made with the camera axis pointed toward the horizon or line at infinity, and such film is then projected with its axially-taken portion projected axially, no vertical or lateral shifting is required to maintain horizon portions coincident as viewpoint displacement is varied. In using the invention for production of a training visual display, it is often desirable to maintain the camera axis pointed away from the horizon in order to utilize more economically the available angular field, and method and means for providing corrective shiftings then required are described in detail in my copending application Serial Number 503,211 filed April 22, 1955 for "Method and Apparatus for Producing Visual Display," and the invention of that application may be used in conjunction with the present invention.

To alter an image perspective from one viewpoint to an image perspective from a desired viewpoint, three things may be determined as explained in connection with FIG. 4; namely, (1) the ratio of the height $h_2$ of the desired image to the height $h_1$ of the original image, (2) the sloping of the original image required to produce the desired image, which sloping is shown as the angle $\alpha$ in FIG. 5, and (3) the fact that horizon line or vanishing point portions of both images are the same, or in other words that the upper lines of the rectangle and final parallelogram are of equal length. Knowing the above three facts, a number of independent relationships concerning FIG. 5b may be written. Since each of the relationships may be derived by means of elementary geometry, trigonometry and algebra, their derivations need not be set forth herein.

$$\tan \beta = m_1 \tan \gamma_a \quad (1)$$

$$\tan \delta_a = \frac{-m_2}{\tan (\gamma_a + \theta)} \quad (2)$$

$$\tan \gamma_b = m_1 \tan \beta \quad (3)$$

$$-\frac{1}{\tan (\gamma_b + \theta)} = m_2 \tan \delta_b \quad (4)$$

$$\frac{h_2}{h_1} = -m_1 m_2 \frac{\sin \delta_b}{\cos \beta} \frac{\cos \gamma_b}{\cos (\gamma_b + \theta)} \quad (5)$$

$$\cos \alpha = m_1 m_2 \frac{\cos \delta_a}{\sin \beta} \frac{\sin \gamma_a}{\sin (\gamma_a + \theta)} \quad (6)$$

$$\tan \alpha = \frac{d}{h_2} \quad (7)$$

$$\alpha = \delta_b - \delta_a \quad (8)$$

$$\rho = \delta_b + (90° - \theta) - \beta \quad (9)$$

It will be seen that the above nine simultaneous equations contain nine unknowns ($m_1$, $m_2$, $\beta$, $\theta$, $\gamma_a$, $\gamma_b$, $\delta_a$, $\delta_b$ and $\rho$) and three independent variable input terms ($d$, $h_1$, and $h_2$) dependent upon the perspective alteration desired. The unknown quantities $m_1$, $m_2$, $\beta$ and $\theta$ may each be termed a control variable, since each relates to an adjustment which may be made to one of the anamorphosers used in the invention. Unknown angle quantities $\gamma_a$, $\gamma_b$, $\delta_a$ and $\delta_b$ are, of course, related to the four control variables in the manner expressed in the equations, but these unknowns do not in themselves express directly and conveniently any physical adjustment which may be made to either or both of the anamorphosers to provide a desired viewpoint displacement. If desired, the nine simultaneous equations given above may be solved analytically and simultaneously to eliminate these four unknown angle quantities, providing four equations which express the control variables in terms of the viewpoint displacement inputs $d$, $h_1$ and $h_2$. The required counter-rotation angle $\rho$ necessary to maintain horizon lines parallel may be separated from the equations needed to specify the dependent control variables $m_1$, $m_2$, $\beta$ and $\theta$, although the angle $\rho$ itself is a function of those variables. The above equations presume that the original and the altered images are to be of the same angular field. As a matter of fact, the original image may consist, for example, of a film taken with a camera of a given focal length, while the projection system utilized in producing an altered image may be of quite a different focal length. In some uses of the invention it may be considered desirable to utilize a conventional wide angle attachment. To produce an image having the same angular field as the original image, any spherical magnification introduced into the system by a difference between camera and projector focal lengths, or any spherical magnification introduced into the system by use of a wide angle attachment or like device should be accounted for in the equations. If such spherical magnification is designated $P_0$, the right-hand sides of Equations (5) and (6) should be multiplied by $P_0$ as follows:

$$\frac{h_2}{h_1} = -P_0 m_1 m_2 \frac{\sin \delta_b}{\cos \beta} \frac{\cos \gamma_b}{\cos (\gamma_b + \theta)} \quad (5a)$$

$$\cos = P_0 m_1 m_2 \frac{\cos \delta_a}{\sin \beta} \frac{\sin \gamma_a}{\sin (\gamma_a + \theta)} \quad (6a)$$

where $$P_0 = \frac{f_c}{f_p} \frac{d_L}{d_e}$$

and wherein $f_c$ = effective focal length of camera lens used to provide original image on film, including "wide angle" attachments, etc., if any;

$f_p$ = effective focal length of the projection lens system (exclusive of any effects produced by the anamorphosers), including "wide angle" attachments, etc., if any $d_L$ = projections throw or distance $d_e$ = viewing distance The constant term $P_0$, shown as the product of system spherical angular magnification and the ratio between projection distance to viewing distance is designated "system spherical magnification" for convenience. Although FIG. 4 illustrates an arrangement in which the projection system is coincident with the viewpoint, it will be apparent that in actual practice of the invention, a projector may be displaced therefrom provided an adjustment of focal lengths is made in accordance with the above expression.

Since the relation between an undistorted and a distorted image requires the specification of three facts, three of the control variables of the systems of the invention must be varied to provide continuous viewpoint displacement. Therefore, provision of two anamorphosers, which together have four controllable variables, requires that one of the controllable variables be maintained constant, or, if allowed to vary, that an additional rsetraint be imposed upon the system. The invention therefore embraces several basic types of differently-arranged apparatus, all of which operate in accordance with the relationships expressed above, and which types may be tabulated as follows:

| Type | Anamorphoser settings varied | Anamorphoser setting maintained constant |
| --- | --- | --- |
| I | $m_1$, $m_2$, $\beta$ | $\theta$. |
| II | $m_1$, $m_2$, $\theta$ | $\beta$. |
| III | $m_1$, $\beta$, $\theta$ | $m_2$. |
| IV | $m_2$, $\beta$, $\theta$ | $m_1$. |
| V | $m_1$, $m_2$, $\beta$, $\theta$ | None, but additional restraint imposed. |

As well as the systems tabulated herein, I have discovered that a number of further systems may be constructed in which the system spherical magnification $P_0$ is varied. Such further systems are shown, described in detail and claimed in my copending application, now Pat. 3,015,988, filed on even date herewith, and entitled "Perspective Alteration Means and Method."

As will be apparent to those skilled in the analogue computer art, the above eight simultaneous equations may be solved simultaneously by provision of eight interconnected servos, or the number of simultaneous equations may be reduced by analytical simultaneous solution to as few as four simultaneous equations containing the four control variable unknowns ($m_1$, $m_2$, $\beta$ and $\theta$), and such four simultaneous equations could be solved in similar manner by three interconnected servos if an arbitrary restraint is placed upon one of the unknowns. Since the dynamic behavior of systems having a large number of interconnected servos is usually not readily analyzed, making stabilization of such systems sometimes quite difficult, I usually prefer to solve analytically and explicitly for the control variables themselves or for simplified functions of the control variables, and to utilize servo systems solving at least in part for the control variables themselves from the input data, so that the number of interconnecting loops is considerably lessened. Shown, however, in FIG. 8 is an electrical schematic diagram of a computer control connected to provide the proper outputs for operating Type I apparatus of the kind shown in FIG. 6 (wherein $m_1$, $m_2$ and $\beta$ are variable and $\theta$ is maintained constant), in which computer control the eight equations given above are solved simultaneously.

System Type I is designated above as having $m_1$, $m_2$ and $\beta$ as variable, with $\theta$ fixed at a constant value, or in other words, that the powers of both anamorphosers and the angular orientation of the first anamorphoser are varied as viewpoint displacement varies, but that the angular orientation of the second anamorphoser with respect to the first anamorphoser is maintained constant. Reference to my copending application Serial Number 500,325 will show that the optical system disclosed therein is a special case of system Type I, in which $\theta$ is fixed at a specific value of ninety degrees. In constructing a Type I system of the invention it is not necessary that $\theta$, the angle between the axes of the anamorphosers be maintained fixed at ninety degrees, and in FIG. 6 there is shown a physical arrangement in which $\theta$ has been fixed at approximately 45 degrees.

System Type II utilizes $m_1$, $m_2$ and $\theta$ as variables and maintains $\beta$ constant, allowing construction of a system in which the first anamorphoser need not be rotated with respect to the original image. In systems utilizing a film or slide projector, this feature allows rigid mounting of the first anamorphoser to the projector case. An exemplary arrangement of apparatus of system Type II is shown in FIG. 3. System Type III utilizes $m_2$, $\beta$ and $\theta$ as variables and maintains $m_2$ constant, allowing construction of projection systems in which the outermost anamorphoser need not be varied in power. An exemplary arrangement of apparatus of system Type III is shown in FIG. 3. System Type IV utilizes $m_2$, $\beta$ and $\theta$ as variables and maintains $m_1$, the power of the first anamorphoser, constant, thereby simplifying certain mechanical arrangements. An exemplary arrangement of system Type IV is shown in FIG. 2. As mentioned above, system Type V varies the powers and angular orientations of both anamorphosers, but imposes an additional restraint upon the system. If the particular restraint selected is $(\beta+\theta)=$ a constant, it will be seen that the second anamorphoser, the angular orientation of which corresponds to $(\beta+\theta)$ with respect to the original image may be fixed in relation to the projector or other image producing apparatus, and hence pinion 118 and its driving means (not shown) should be eliminated. It will be apparent that a practically infinite number of arbitrary restraints exist, and selection of the most useful restraint depends to a great extent upon the allowable complication of the mechanical apparatus and the control computer utilized. If desired, the arbitrary restraint may consist of maintaining the required counter-rotation angle $\rho$ equal to a constant, so that the images need not be axially rotated to keep horizon lines coincident. The method and means by which such arbitrary restraints may be imposed on the control system will be further described below, and an exemplary control system for a system involving an added arbitrary restraint will be illustrated.

Referring to FIGS. 1, 2, 3, 6, and 7, there are shown exemplary mechanical arrangements for several different optical systems constructed in accordance with the invention, and in these figures like numerals correspond to like parts. It should be emphasized that the mechanical arrangements shown for varying anamorphoser power and for axially rotating the anamorphosers are illustrative only. While I have shown these various systems as attachments suitable for addition to a projector, it will be immediately apparent that the various optical elements may be mounted and housed in many different arrangements. It will also be apparent that while I have shown the optical elements of each system coaxially arranged physically, that reflectors and similar apparatus may be used in the systems of the invention, and it is necessary only that the optical elements be coaxial optically.

FIG. 1 shows an image-producing source PR such as a conventional slide or motion picture projector, which casts an image toward the right as viewed in the figure along optical axis O—O. The image may be focused on a screen (not shown) or other surface. In utilizing the invention for production of slanted lettering or perspectively-altered still photographs, the image may be focused onto a photo-sensitive surface. Mounted for axial rotation on projector PR is a lens barrel 101. Toothed flange 102 of barrel 101 is journalled in the projector housing, and the ends of barrel 101 are rotatably supported by bearing pedestals 103 and 104. Pinion 105 engages toothed flange 102, so that rotation of pinion 105 serves to rotate lens barrel 101. Pinion 105 may be rotated by a $\beta$ servo-motor M–300 (not shown). Carried within lens barrel 101 are two positive cylindrical lenses, $L_a$ and $L_b$, and a negative cylindrical lens $L_2$, which three cylindrical lenses have their axes of magnification aligned so as to form a variable power anamorphoser. Positive cylindrical lenses $L_a$ and $L_b$ each are slidably mounted in barrel 101 by means of longitudinal keyways (not shown), which constrain the lenses from axial rotation with respect to each other. Cam pins 106 and 107 are rigidly attached to lenses $L_a$ and $L_b$, respectively, and protrude through longitudinal slots cut in lens barrel 101. Cam pins 106 and 107 also protrude through non-linear cam slots such as 108 cut in a rotatable sleeve 109 which surrounds barrel 101. An $m_1$ servo-motor M–100 is rigidly mounted to barrel 101 by means of mounting 110, and pinion 111 on the shaft of motor M–100 drives a toothed flange portion 112 of rotatable sleeve 109, thereby rotating sleeve 109 axially. As sleeve 109 rotates, the non-linear cam slots move positive cylindrical lenses $L_a$ and $L_b$ axially with respect to fixed negative cylindrical lens $L_c$, changing the anamorphic magnification of the first anamorphoser. The relationships between lens movement and magnification of such type variable anamorphoser are shown and explained in detail in my copending application Serial Number 480,033 and need not be repeated herein. Furthermore, other types of variable anamorphosers may be substituted for the type shown without departing from the invention. Mounted co-axially with the first anamorphoser described above is a second anamorphoser comprising negative and positive cylindrical lenses $L_3$ and $L_4$, each of which are fixedly mounted within a rotatable lens barrel 115, which is rotatably supoprted by bearing pedestals 116, 117. Rotation of pinion 119 through the angle $\theta$ drives toothed flange portion 118 of barrel 115, thereby axially rotating the second anamorphoser. Lenser $L_3$ and $L_4$ have their axes of magnification aligned with each other, but since the distance between lenses is not varied, the second anamorphoser is not variable in power. While I have shown the apparatus of various embodiments of the invention as being motor-positioned, it will be apparent that in many uses of the invention, as, for example, where alteration of still images is desired, that the optical elements may be manually-positioned, and suitable dials and scales may be provided on the apparatus to facilitate setting the various elements to desired powers and angles.

FIG. 2 shows a system having a rotatable, fixed power first anamorphoser and a rotatable variable power second anamorphoser. An $m_2$ servo-motor M–200 varies the power of the second anamorphoser of FIG. 2 in the same manner mechanically as the $m_1$ servo of FIG. 1 varies the first anamorphoser. Servomotor M–300 (not shown) angularly positions the fixed power first anamorphoser by means of pinion 105, and rotation of pinion 119 angularly positions the second anamorphoser. FIG. 3 shows a system in which the first anamorphoser is variable in power but not rotatable. Pinion 111 is positioned by $m_1$ servo-motor M–100 (not shown), and lens barrel 101 may be rigidly affixed to the projector case. Motor M–400 rotates lens barrel 115 through the angle $\theta$, and motor M–200 varies the power of the second anamorphoser in the same manner as in FIG. 2.

FIG. 6 illustrates system Type I apparatus, in which both anamorphosers are mounted within the same lens barrel 101a, so that the angle $\theta$ between their axes of magnification is maintained constant. In FIG. 6 the angle $\theta$ is shown at approximately 45 degrees. Lens barrel 101a is axially rotated through the angle $\beta$ by means of servo M–300 (not shown) which is geared to toothed flange 102 by barrel 101a by means of pinion 105. Servo M-100 rotates sleeve 109 by means of pinion 111, so that curved slots in sleeve 109 may operate on cam pins 106 and 107, thereby axially moving lenses $L_a$ and $L_b$ with respect to lens $L_2$. Similarly, servo M-200 varies the power of the second anamorphoser, cam pins 122 and 123 serving to position lenses $L_{3a}$ and $L_{3b}$ with respect to fixed negative cylindrical lens $L_4$. As mentioned above, a specific embodiment of Type I apparatus in which the two anamorphosers are maintained perpendicular as shown in my copending application Serial Number 500,325. It is not necessary in constructing Type I apparatus that the two anamorphosers be arranged at 90 degrees or at any multiple or submultiple of 90 degrees. It is necessary only that the axes of magnification of the two anamorphosers not be aligned at zero or 180 degrees if lateral displacement of the viewpoint is to be provided in the perspectively altered image.

FIG. 7 illustrates a Type V embodiment of the invention, in which all four of the control variables are varied, so that an arbitrary restraint must be improved on the control computer. Since parts of the apparatus of FIG. 7 are numbered similarly to parts of the preceding figures, a detailed description of FIG. 7 is deemed unnecessary.

It will be recalled from FIG. 5 that $\theta$ represents the angle between the power axes of the first and second anamorphosers, and hence if the first anamorphoser is rotated through the angle $\beta$ with respect to the image projector, any $\theta$ servomotor used to angularly position the second anamorphoser should be either carried bodily with the first anamorphoser so that $\theta$ will be measured from the $m_1$ axis, or else the second anamorphoser should be rotated through the sum of the $\beta$ and $\theta$ angles by a shaft fixed with respect to the image projector. Hence if the precise mechanical arrangement of FIG. 1 were used, pinion 119 should be positioned in accordance with $\beta$ and $\theta$ either by controlling servo M-400 in accordance with $(\beta+\theta)$, or by driving pinion 119 from a mechanical differential having $\beta$ and $\theta$ inputs from servos M-300 and M-400. The same theory applies to each of the other arrangements should, except, of course, in FIG. 6 where no $\theta$ rotation is necessary.

While I have shown specific types of variable power anamorphosers in illustrating the invention, other types may be readily substituted, as for example, prism-type variable anamorphosers such as the "Hi-Lux Val" type, made by Projection Optics Co. of Rochester, N.Y. and the "Super-Panatar" and "Ultra-Panatar" types manufactured by Radiant Manufacturing Coporation of Chicago, Illinois. The optical elements of both anamorphosers may be interleaved in some embodiments of the invention, although this usually leads to greater mechanical complication of the system. I have shown each anamorphoser as an attachment which may be added to a conventional projection system, but it will be readily apparent to those skilled in the art that ordinary spherical projection lenses may be carried in the variable anamorphoser housings rather than on the image projector, and in some uses of the invention, no projection lenses would be required. Furthermore, wide angle attachments and/or fixed-power non-rotatable anamorphic attachments may be added to the systems to obtain wider field coverage and/or the usual benefits of "Cinemascope" type projection without departing from the invention.

In FIG. 8 a servo is provided for each of the known variables of the eight equations, and an input means is provided for setting $\theta$, the angle between the first and second anamorphoser axes, at a desired value. Also provided is a spherical magnification input control to be set in accordance with any spherical magnification introduced into the system by means of a wide angle attachment or like device, or by use of a camera and projector combination having different focal lengths. In order that conventional analogue computer sin-cosine resolvers may be used, the tangent terms of the equations have been replaced by sin/cos terms, and the equations have been multiplied to eliminate fractions, thereby simplifying the computer. In FIG. 8 and other electrical schematics herein sine and cosine resolvers have been shown as simple potentiometers for sake of clarity and convenience of explanation, and those skilled in the art will recognize that resolvers capable of 360 degree resolution may actually be used. The feedback amplifiers shown may comprise conventional analogue computer summing amplifiers, having high loop gain and unity overall gain, although series summing may be used if desired. A number of amplifiers used for polarity inversion and a number of buffer amplifiers have been omitted for sake of clarity. The servos shown in block form may comprise completely conventional analogue computer servos, employing conventional amplifying means, appropriate electrical, mechanical or hydraulic motive means, and such servos may be provided with numerous well-known refinements and constructional details, such as tachometer generator or other rate feedback, reduction gearing, mechanical limit stops, etc. While I have shown the $\theta$ and $P_0$ input controls as being manually adjustable, so that the controller may be used with systems having various values of $\theta$ (second anamorphoser angle) and $P_0$ (spherical magnification), it should be understood that in constructing a controller for use with a system using specific values of $\theta$ and $P_0$, that the potentiometers and resolvers shown as manually adjustable may be replaced by fixed resistors. If a value of $\theta$ is judiciously selected, the equations will greatly simplify. Reference may be had to my copending application Serial Number 500,325 wherein $\theta$ is set at 90 degrees, so that sin $\theta$ becomes unity and cos $\theta$ becomes zero, and a simplified controller has been constructed using the simplified equations.

The $\gamma_a$ servo M-1 solves Equation (1) in its modified form:

$$\sin \beta \cos \gamma_a - m_1 \sin \gamma_a \cos \beta = 0 \quad (1b)$$

A potential proportional in magnitude to the first term of Equation (1b) is derived by means of sine resolver R-11 and cosine resolver R-12, and is applied via summing resistance R-13 to the input circuit of servo M-1. The second term of Equation (1b) is derived by means of linear potentiometer R-16, the arm of which is positioned by $m_1$ servo M-5, sine resolver R-15, and cosine resolver R-14, and the potential proportional to such term is applied via summing resistance R-17 to the input circuit of servo M-1, to be summed with the previously mentioned potential. Each of the other servos receives input potentials in a similar manner. The $\delta_a$ servo M-2 solves Equation (2) in the following modified form:

$$\sin \delta_a \sin (\gamma_a+\theta) + m_2 \cos \delta_a \cos (\gamma_a+\theta) = 0 \quad (2b)$$

The first term of Expression (2b) is derived by means of sine resolvers R-18 and R-19. The shaft of resolver R-19 may be seen to be positioned in accordance with the angle $(\gamma_a+\theta)$ by the output of differential 801, which receives shaft inputs commensurate with the angle $\gamma_a$ from servo M-1 and the angle $\theta$ from manual input control knob 802. The second term of Expression (2b) may be seen to be derived by potentiometer R-20, cosine resolvers R-21 and R-22. The potentials proportional to the first and second terms are applied to the input circuit of servo M-2 via summing resistors R-23 and R-24, respectively.

The $\alpha_b$ servo M-3 solves Expression (3) in the following modified form:

$$\sin \gamma_b \cos \beta - m_1 \sin \beta \cos \gamma_b = 0 \quad (3b)$$

A potential proportional to the first term of Expression (3b) is derived by means of sine resolver R-25 and cosine resolver R-26, and is applied to the input circuit of servo M-3 via summing resistor R-27. A potential proportional to the second term of Expression (3b) is derived by means of potentiometer R-28, sine resolver R-29 and cosine resolver R-30, and is applied to the input circuit of servo M-3 via summing resistor R-31.

The $m_2$ servo M-4 solves Expression (4) in the following modified form:

$$m_2 \sin \delta_b \sin (\gamma_b+\theta) + \cos (\gamma_b+\theta) \cos \delta_b = 0 \quad (4b)$$

A potential proportional to the first term of Equation (4b) is derived by means of potentiometer R-32, and sine resolvers R-33 and R-34. The second term potential is derived by means of cosine resolvers R-35 and R-36. Resolvers R-34 and R-36 are connected to have their arms positioned in accordance with the angle $(\gamma_b+\theta)$ by the output shaft of mechanical differential 803, which receives input shaft quantities of $\gamma_b$ from servo M-3 and $\theta$ from the manual input control knob 802.

The $m_1$ servo M-5 solves Expression (5) in the following modified form:

$$h_2 \cos \beta \cos (\gamma_b+\theta)$$
$$+ m_1 m_2 h_1 P_0 \sin \delta_b \cos \gamma_b = 0 \quad (5b)$$

A potential proportional to the altitude $h_2$ of the desired viewpoint is applied at terminal 804, modified by cosine resolvers R-37 and R-38, and applied via summing resistor R-39. The second term potential of Expression (5b) is derived by means of manually-adjusted $P_0$ linear potentiometer R-40, linear potentiometers R-41 and R-42, sine resolver R-43 and cosine resolver R-44, and the modified potential is applied to the input circuit of servo M-5 via summing resistor R-52. Manually adjusted potentiometer R-40 may be adjusted in accordance with any spherical magnification introduced into the system as mentioned above.

The $\beta$ servo M-6 solves Expression (6) in the following modified form:

$$\cos \alpha \sin \beta \sin (\gamma_a+\theta)$$
$$- m_1 m_2 P_0 \cos \delta_a \sin \gamma_a = 0 \quad (6b)$$

The potential proportional to the first term of Expression (6b) is derived by means of cosine resolver R-46 and sine resolvers R-47 and R-19, and is applied via summing resistor R-48 to the input circuit of servo M-6. The second term potential is derived by means of linear potentiometers R-51, R-52, R-53, sine resolver R-49 and cosine resolver R-50, and is applied via summing resistor R-54 to the input circuit of servo M-6.

The $\alpha$ servo M-7 solves Expression (7) in the following modified form:

$$h_2 \sin \alpha - d \cos \alpha = 0 \quad (7b)$$

The potential proportional to the first term of Expression (7b) is derived by modifying the $h_2$ input potential from terminal 804 in accordance with $\sin \alpha$ by means of sine resolver R-55, and this potential is applied to the input circuit of servo M-7 via summing resistor R-56. The second term potential is derived by applying the lateral displacement or $d$ input potential to cosine resolver R-58 from terminal 805.

The $\delta_b$ servo M-8 solves Expression (8) in the following modified form:

$$\delta_b - \delta_a - \alpha = 0 \quad (8b)$$

The $\delta_b$ potential is derived by means of linear follow-up potentiometer R-59 and applied via summing resistor R-60 to the input circuit of servo M-8. The $\delta_a$ and the $\alpha$ potentials are derived by linear potentiometers R-61 and R-62 which are actuated by servos M-2 and M-7, respectively, and such potentials are applied to the input circuit of servo M-8 via summing resistances R-63 and R-64.

Those skilled in the art will recognize that each servo will continuously adjust its output shaft so as to minimize its input signal, and therefore, that as the $h_1$, $h_2$ and $d$ input potentials are varied, the servos will reposition themselves so as to maintain their shafts at positions commensurate with their respective variables. Servo M-5 may be mechanically connected via pinion 111 to the first anamorphoser of FIG. 6 to vary $m_1$, the power of the first anamorphoser. Servo M-4 may vary the power $m_2$ of the second anamorphoser via pinion 121, and $\beta$ servo M-6 may axially rotate the image alteration apparatus with respect to the original image by means of pinion 105. While I have shown a specific computer for controlling the apparatus of FIG. 6, it is not at all necessary that the particular servos be utilized to solve for the particular variables. Those skilled in the art will recognize as a result of the disclosure, that the relationships between an original image and an altered image defined by the equations given may be altered in an infinite number of different ways without departing from the invention.

By solving equations (1) through (9) analytically and simultaneously, one may provide further equations which are more conveniently mechanized. By elementary algebra and trigonometry the following equations may be obtained:

$$\sin^2 \theta = \frac{\dfrac{h_1^2+h_2^2+d^2}{h_1 h_2} - m_1 m_2 - \dfrac{1}{m_1 m_2}}{\dfrac{m_1}{m_2}+\dfrac{m_2}{m_1} - m_1 m_2 - \dfrac{1}{m_1 m_2}} \quad (10)$$

$$\left(m_2 - \frac{1}{m_2}\right) \sin 2\theta = \left(\frac{h_1^2 - h_2^2 - d^2}{h_1 h_2}\right) \sin 2\beta + \frac{2d}{h_2} \cos 2\beta \quad (11)$$

$$P_0^2 m_1 m_2 = \frac{h_2}{h_1} \quad (12)$$

$$\left(\frac{h_1+h_2}{h_1 P_0}\right) \cos \rho + \left(\frac{d}{h_1 P_0}\right) \sin \rho = (m_1 m_2 + 1) \cos^2 \theta$$
$$+ (m_1 + m_2) \sin^2 \theta \quad (13)$$

In the above solution the system spherical magnification $P_0$ has been included by using Equations (5a) and (6a). If a spherical magnification of unity is used, $P_0$ may be replaced by 1.0 in the equations. The above four equations may be re-arranged and solved together in very many ways, to provide further equations which may be deemed preferable for analog computer solution in particular embodiments of the invention.

Referring now to FIG. 10 there is shown an exemplary form of a portion of a control computer. The independent variables which express desired viewpoint displacement are shown as being applied to manually positionable control knobs 1000, 1001 and 1002. In certain embodiments of the invention the shafts shown as positioned by the aforesaid control knobs may be set automatically as by means of servos, for example. In my co-pending applications Serial Numbers 480,033 and 500,325 I have shown systems in which such input quantities are automatically provided in accordance with the instantaneous location of a simulated aircraft. The apparatus of FIG. 10 receives the independent variable input data and provides a number of output potentials which are various functions of said variables. These output potentials, which are present at the terminals at the right hand side of FIG. 10, may be used to actuate the various controllers shown in FIGURES 11 through 16. Control knob 1000 may be set to the altitude $h_1$ (measured in the plane of the original viewpoint) of the original viewpoint. Control knob 1001 may be set to the altitude $h_2$ (measured in the same plane) to which the resultant viewpoint is required to be located. Control knob 1002 may be set in accordance with the desired lateral displacement of the desired viewpoint measured in the same plane from the originial viewpoint. Potentiometer R-1001 is excited by a constant potential by the computer power supply and its wiper arm is positioned by knob 1000 to provide an input potential proportional to $h_1$ via resistor R–1004 to amplifier U–1001. The $-h_1$ output potential from amplifier U–1001 is applied to terminal 1003, and also inverted in polarity or sign by amplifier U–1010 and applied to terminal 1004. In similar manner, $-h_2$ and $+h_2$ potentials are developed by potentiometer R–1005, amplifiers U–1002 and U–1012 and applied to terminals 1008 and 1010, respectively.

The $-h_1$ output potential from amplifier U–1001 is applied to excite potentiometer R–1002, the arm of which is positioned by knob 1000, deriving a $-h_1^2$ potential which is applied to summing amplifier U–1006 and which also is inverted in sign by amplifier U–1017 and applied to summing amplifier U–1008 via summing resistor R–1023. A $-h_2^2$ potential is developed in similar manner by potentiometer R–1006 and applied via summing resistor R–1035 to amplifier U–1006. A $+d^2$ potential derived by potentiometers R–1007 and R–1008 is inverted in sign by amplifier U–1007 and applied via resistor R–1036 to amplifier U–1006. The sum of these potentials from amplifier U–1006 modified in accordance with $h_1$ by potentiometer R–1010, further modified in accordance with $h_2$ by potentiometer R–1020, and fed back to the input circuit of amplifier U–1006, via resistor R–1037. As those skilled in the art will immediately recognize, the modification of the summed input potentials by $h_1$ and $h_2$ in the manner shown serves to provide an output potential from amplifier U–1006 divided by $(h_1 h_2)$, so that the potential applied to terminal 1006 is proportional to the quantity:

$$\frac{h_1^2 + h_2^2 + d^2}{h_1 h_2}$$

This potential is also inverted in sign by amplifier U–1011 and made available on terminal 1005. In similar manner an output potential proportional to $$\left( \frac{h_1^2 - h_2^2 - d^2}{h_1 h_2} \right)$$

is provided by amplifier U–1008 and applied to terminals 1011 and 1012. The $-h_1$ output potential from amplifier U–1001 applied to amplifier U–1005 is divided by $h_2$ by means of potentiometer R–1015, providing an output potential proportional to $-h_1/h_2$ on terminal 1009. Similarly, the output potential $-h_2$ from amplifier U–1002 is divided by $h_1$ by means of amplifier U–1004 and potentiometer R–1003 and applied with opposite signs to terminals 1015 and 1007, and similarly, $d/h_2$ and $-d/h_1$ potentials are derived and applied with various polarities to terminals 1013, 1014 and 1016. Each of the amplifiers shown in FIG. 10 may comprise a conventional analogue computer feedback amplifier.

The controllers for the various systems of the invention shown in FIGS. 11 through 14 each are shown provided with a manually adjustable $P_0$, or spherical magnification control and a manually adjustable control which may be set in accordance with the selected constant value of either the power or the angular position of one of the anamorphosers. The controller shown in FIG. 15 is provided solely with a spherical magnification control since both the powers and angular positions of both anamorphosers of a Type V system vary as perspective alteration is varied. It should be understood that in providing controllers for use with specific embodiments of the invention wherein system spherical magnification and/or the other manually adjustable shaft need not be varied, that the variable potentiometers and resolvers shown as being adjusted by the manually operable shafts may be replaced by fixed resistors. Furthermore, the use of $\beta$ or $\theta$ angles of 0, 90, 180, and 270 degrees in those systems in which $\beta$ or $\theta$ are constants will be seen to simplify greatly the equations, so that many terms of the equations become zero or unity, and the equations may be mechanized using many less parts. Certain limitations on the selection of these angles will become apparent either by examination of the equations, or preferably from examination of plots of the equations. For example, in system Type I wherein $\theta$, the second anamorphoser angle, is maintained constant, the value of $\theta$ must not be set at zero degrees (or 180 degrees) if displacement of the viewpoint over an area is to be obtained, since both anamorphosers would be acting along the same axis and could not control image height and image shearing independently. Similarly, the angle $\beta$, the angle of the first anamorphoser must not be set to zero or 180 degrees if a continuous displacement Type II system is to be provided. In systems Types III and IV wherein $m_2$ or $m_1$, the power of one of the anamorphosers is maintained constant, it will be apparent that such power should not be unity, since an anamorphoser having unity power is inoperative to affect the shape of the image. In the illustrated Type V system wherein the powers of both anamorphosers are maintained equal although variable, it is necessary that system $P_0$ not equal unity if lateral displacement near the original viewpoint is desired. Equations (10) through (13) may be plotted on lateral displacement $d$ and resultant viewpoint altitude $h_2$ coordinates by assuming an original viewpoint location $h_1$, a particular system spherical magnification $P_0$, and a particular value for the control quantity maintained constant, and by substituting various values of the three variables into the equations. The characteristics of a particular embodiment of the invention may be understood very easily from such charats. Charts of this nature are reproduced in my copending application Serial Number 548,842, filed on even date, now Pat. No. 3,015,988, my copending application Serial Number 500,325, now Pat. No. 3,101,645 and my copending application Serial Number 511,488, now Pat. No. 2,975,671, and reference may be had to such applications.

Referring now to FIG. 11 there is shown in electrical schematic form an exemplary controller for operating a Type I embodiment of the invention such as that illustrated in FIG. 6, wherein the powers of both anamorphosers are varied, the angular position $\beta$ of a first anamorphoser with respect to the original image is varied, but the angular position $\theta$ of the second anamorphoser with respect to the first anamorphoser is maintained constant. Control knob 1101 may be adjusted in accordance with the value at which the angle $\theta$ is maintained. The $m_2$ servo shown in block form receives input potentials which are various functions of the independent variables ($h_1$, $h_2$, $d$) and functions of the constant quantities $\theta$ and $P_0$, the system spherical magnification. Solving Equation (12) for $m_1$ and substituting the answer into Expression (10), the following expression is obtained, and this expression is solved by the $m_2$ servo:

$$\left[ \frac{h_2}{h_1 P_0^2} \left( \frac{1}{m_2^2} - 1 \right) + \frac{h_1 P_0^2}{h_2} (m_2^2 - 1) \right] \sin^2 \theta$$

$$= \frac{h_1^2 + h_2^2 + d^2}{h_1 h_2} - \frac{h_2}{h_1 P_0^2} - \frac{h_1 P_0^2}{h_2} \quad (14)$$

The potential proportional to $h_1/h_2$ provided on terminal 1009 is multiplied twice by $P_0$ by potentiometers R–1128 and R–1129 to provide the quantity $h_1 P_0^2/h_2$, which is applied to the input circuit of the $m_2$ servo via summing resistor R–1105. The potential proportional to $h_2/h_1$ is divided by $P_0^2$ by means of amplifier U–1108, potentiometers R–1130 and R–1131 and applied to the $m_2$ servo via summing resistor R–1106. A potential corresponding to the remaining term on the right-hand side of the above expression is applied from terminal 1106 via summing resistance R–1108 to the input circuit of the $m_2$ servo. The $$\frac{h_2}{h_1 P_0^2}$$

and $$\frac{h_1 P_0^2}{h_2}$$

potentials are also applied directly as inputs to summing amplifier U–1105. The $$\frac{h_2}{h_1 P_0^2}$$

potential is divided by $m_2^2$ by potentiometers R–1112 and R–1113 with amplifier U–1109 and applied to amplifier U–1105. The $$\frac{h_1 P_0^2}{h_2}$$

potential is multiplied by $m_2^2$ by means of potentiometers R–1109 and R–1110 and applied to amplifier U–1105. The output potential from summing amplifier U–1105 may be seen to be proportional to the bracketed quantity in the above expression. This potential is multiplied by $\sin^2 \theta$ by means of resolvers R–1101 and R–1102 and the resulting potential applied to the input circuit of the $m_2$ servo via summing resistor R–1107. Since the potentials applied to the $m_2$ servo will balance to zero when and only when potentiometer R–1109, R–1110, R–1112 and R–1113 are adjusted to a position commensurate with $m_2$, the $m_2$ servo will continuously maintain its output shaft in a position commensurate with $m_2$, providing the required shaft output quantity to vary the power of the second anamorphoser via pinion 121.

The $m_1$ servo of FIG. 11 solves Expression (12). A potential proportional to $-h_2$ derived as shown in FIG. 10 is applied to the input circuit of the $m_1$ servo via terminal 1008 and summing resistor R–1123. A potential proportional to $h_1$ on terminal 1004 is multiplied by $P_0^2$ by means of potentiometers R–1132 and R–1133, further multiplied by $m_1$ by means of potentiometer R–1125, multiplied by $m_2$ by means of potentiometer R–1116 and applied to the input circuit of the $m_1$ servo via summing resistor R–1124. Since the quantities applied to the $m_1$ servo will balance to zero only when potentiometer R–1125 is adjusted commensurately with $m_1$, the $m_1$ servo continuously positions its output shaft in accordance with $m_1$ providing a shaft output to adjust the power $m_1$ of the first anamorphoser to the required value via pinion 111.

The $\beta$ servo of FIG. 11 solves Expression (11). Potentials proportional to $m_2$ and $1/m_2$ are derived with appropriate polarity of potentiometers R–117 and R–118 and summed in amplifier U–1111. The output potential of amplifier U–1111 is multiplied by sine $2\theta$ by means of resolver R–1103 to provide a potential proportional to the left hand side of Equation (11), which potential is applied to the $\beta$ servo via summing resistor R–1134. The shaft of resolver R–1103 is positioned in accordance with the angle $2\theta$ by means of control knob 1101, a 1:2 gear reduction 1103 being provided as shown. The potentials proportional to the right hand side of Expression (11) are derived by applying appropriate functions of the independant variables via terminals variables via terminals 1011 and 1013 and modifying such potentials by sin $2\beta$ and cos $2\beta$ by means of resolvers R–1137 and R–1138, respectively, the arms of which are positioned by the output shaft of the $\beta$ servo through a 1:2 gear reduction 1104. The $\beta$ servo provides an output shaft quantity to position the first anamorphoser at an angle $\beta$ with respect to the original image via pinion 105.

Referring now to FIG. 12, there is shown in electrical schematic form an exemplary controller which may be used to operate a Type II embodiment of the invention such as that shown in FIG. 3, wherein the powers of both anamorphosers are varied and the angular orientation $\theta$ of the second anamorphoser with respect to the first is varied, but where the angular orientation $\beta$ of the first anamorphoser with respect to the original image is maintained constant. A $P_0$ control knob 1203 may be manually set in accordance with the system spherical magnification, thereby adjusting the positions of potentiometers R–1201, R–1202, R–1203, R–1204, R–1205 and R–1206. A $\beta$ control knob 1204 is provided to act through gear reducer 1201 to set the shafts of resolvers R–1231, R–1234, R–1236 and R–1237 in accordance with the angle $2\beta$. If desired, the gear reducer 1201 may be eliminated, and the dial or scale (not shown) used to set knob 1204 may be graduated in terms of $2\beta$. The $m_1$ servo of FIG. 12 receives input potentials which are functions of the independent variables ($h_1$, $h_2$, $d$) and the constant settings of control knobs 1203 and 1204 to solve the following expression, which may be obtained by solving simultaneously particular ones of Equations (1) through (4), (5a), (6a) and (7) through (9).

$$\left(\frac{h_1^2 - h_2^2 - d^2}{h_1 h_2}\right) \cos 2\beta \left[\frac{2d}{h_2} \sin 2\beta\right]$$
$$= \frac{1}{(1-m_1^2)}\left[(1+m_1^2)\left(\frac{h_1^2 + h_2^2 + d^2}{h_1 h_2}\right) - \frac{2m_1^2 h_1 P_0^2}{h_2} - \frac{2h_2}{h_1 P_0^2}\right]$$

(15)

Multiplying both sides of the above expression by $(1-m_1^2)$ yields:

$$(1-m_1^2)\left[\left(\frac{h_1^2 - h_2^2 - d^2}{h_1 h_2}\right) \cos 2\beta - \frac{2d}{h_2} \sin 2\beta\right]$$
$$= \left[(1+m_1^2)\left(\frac{h_1^2 + h_2^2 + d^2}{h_1 h_2}\right) - \frac{2m_1^2 h_1 P_0^2}{h_2} - \frac{2h_2}{h_1 P_0^2}\right] \quad (16)$$

A potential proportional to the first term on the right hand side of Equation (16) is obtained by applying the potential on terminal 1006 directly to the input circuit of the $m_1$ servo via summing resistor R–1211 and by applying the same potential as modified by $m_1^2$ by potentiometers R–1215 and R–1216 to the input circuit via resistor R–1217. The second term on the right hand side of Expression (16) is applied by modifying the $-2_{h1}/h_2$ potential on terminal 1009 by $P_0^2$ by means of potentiometers R–1201 and R–1202, and by further modifying the potential in accordance with $m_1^2$ by means of potentiometers R–1218 and R–1219, to provide a servo input potential via summing resistor R–1220. The third term on the right hand side of the expression is derived by dividing the potential of terminal 1015 by $P_0^2$ by means of potentiometers R–1203 and R–1204 and amplifier U–1201, and this potential is applied via summing resistor R–1210. The bracketed quantity on the left-hand side of Expression (16) is derived by modifying the input potential from terminal 1013 by sin $2\beta$ by resolver R–1234, by modifying the input potential from terminal 1012 by cos $2\beta$ by means of resolver R–1231, and by combining the two potentials in summing amplifier U–1203. The output quantity from amplifier U–1203 representing the bracketed quantity is multiplied by $(1-m^2)$ in being applied to the $m_1$ servo, the amplifier output being connected directly to the $m_1$ servo via summing resistor R–1209 and also being connected indirectly via summing resistor R–1214 after having been multiplied by $m_1^2$ by potentiometers R–1212 and R–1213 and inverted in polarity by amplifier U–1202. Since the input potentials applied to the $m_1$ servo input circuit cancel out to zero when and only when the output shaft of the $m_1$ servo has adjusted the arms of its potentiometers to a position commensurate with $m_1$, a shaft output is provided from the $m_1$ servo to drive pinion 111 of FIG. 3 to vary the power of the first anamorphoser as required. The $m_2$ servo of FIG. 12 solves Equation (12). An $h_1$ potential from terminal 1004 is multiplied by $P_0^2$ by means of potentiometers R–1205 and R–1206, further multiplied by $m_1$ by potentiometer R-1221, multiplied by $m_2$ by potentiometer R-1222 and applied to the input circuit of the $m_2$ servo via summing resistance R-1223 to be balanced against a $-h_2$ potential applied via terminal 1008 and summing resistor R-1224. The $m_2$ servo, which may include motor M-200 of FIG. 3, adjusts potentiometer R-1222 so as to minimize servo input potential, thereby providing a shaft output to adjust the power of the second anamorphoser to its required value via pinion 121. The $\theta$ servo of FIG. 12 solves Equation (11). A potential proportional to $-m_2$ derived by potentiometer R-1226 and a potential proportional to $1/m_2$ are summed in amplifier U-1206, multiplied by $\sin 2\theta$ by resolver R-1241, and applied to the $\theta$ servo input circuit via summing resistor R-1240. Potentials proportional to the other terms of Expression (11) are derived by modifying the input potential of terminal 1012 by $\sin 2\beta$ by resolver R-1237 and by modifying the input potential of terminal 1013 by $\cos 2\beta$ by resolver R-1236, and applying the modified potentials to the servo via summing resistors R-1238 and R-1239, respectively. The $\theta$ servo, which may include motor M-400 of FIG. 3, adjusts resolver R-1241 to minimize its input signal, thereby providing a shaft output to adjust the angular position of the second anamorphoser of the apparatus of FIG. 3.

Referring now to FIG. 13 there is shown in electrical schematic form an exemplary embodiment of a controller which may be used to operate a Type III system, such as that shown in FIG. 1, wherein the power $m_2$ of the second anamorphoser is maintained constant and wherein the power $m_1$ of the first anamorphoser and the angular orientations of both anamorphosers are caused to vary as various viewpoint displacements are created. Control knobs 1307 and 1308 are provided to be adjusted in accordance with the constant power of the second anamorphoser and the system spherical magnification. The $m_1$ servo of FIG. 13 solves Equation (12). A potential proportional to $h_1$ on terminal 1004 is multiplied by $P_0^2$ by potentiometers R-1301 and R-1302, further multiplied by $m_1$ by potentiometer R-1303 and applied to the $m_1$ servo input circuit via resistor R-1304. A potential proportional to $h_2$ from terminal 1010 is divided by $m_2$ by means of potentiometer R-1306 and amplifier U-1301 and applied to the $m_1$ servo via summing resistor R-1305. The $m_1$ servo, which may include motor M-100 of FIG. 1, operates so as to minimize its input, thereby providing a shaft output proportional to the required power of the first anamorphoser.

The $\theta$ servo of FIG. 13 solves Equation (10). Potentials proportional to $m_1/m_2$, $m_2/m_1$, $m_1m_2$ and $1/m_1m_2$ are derived in straightforward fashion, summed in amplifier U-1302, multiplied by $\sin^2 \theta$ by resolvers R-1335 and R-1336 and applied to the $\theta$ servo input circuit via resistor R-1330. The input potential on terminal 1005 is applied via R-1329 and potentials of appropriate polarity proportional to $m_1m_2$ and $1/m_1m_2$ are applied as inputs via summing resistances R-1327 and R-1328, respectively. The $\theta$ servo, which may include motor M-400 of FIG. 1, operates to minimize the sum of these potentials and thereby provides a shaft output position commensurate with the angle at which the second anamorphoser should be adjusted with respect to the first anamorphoser. The $\beta$ servo of FIG. 13 solves Equation (11). Potentials proportional to $-m_2$ and $1/m_2$ are derived by potentiometers R-1315 and R-1309, summed in amplifier U-1305, multiplied by $\sin 2\theta$ by resolver R-1337 and applied as an input circuit to the $\beta$ servo via summing resistor R-1338. Potentials commensurate with the other terms of the equation are derived by modifying the potentials on terminals 1011 and 1013 by $\sin 2\beta$ and $\cos 2\beta$ by means of resolvers R-1339 and R-1340, and such potentials are then applied to the input circuit of the $\beta$ servo via summing resistors R-1342 and R-1341. The $\beta$ servo drives resolvers R-1339 and R-1340 through gear reduction 1306 to minimize the servo input, thereby providing a shaft output to vary the angular position of the first anamorphoser as required. It should be noted that motor M-400 of the $\theta$ servo is mounted in FIG. 1 so that it rotates the second anamorphoser with respect to the projector or original image rather than with respect to the axis of the first anamorphoser. In order that change in the angle $\beta$ will not affect the angle $\theta$ between the first and second anamorphosers, the angular quantity $\beta$ may be combined with the angular quantity $\theta$ as by means of mechanical differential 1310, so that pinion 119 of FIG. 1 is actually driven by the quantity $(\beta+\theta)$ rather than merely by $\theta$.

Referring now to FIG. 14 there is shown in electrical schematic form an exemplary controller which may be used to operate Type IV embodiments of the invention, such as that shown in FIG. 2, for example, wherein $m_1$, the power of the first anamorphoser is maintained constant and the power $m_2$ of the second anamorphoser and the angular orientations of both anamorphosers are varied to provide desired viewpoint displacement. Control knobs 1401 and 1402 are provided to be adjusted to the constant values of system spherical magnification $P_0$ and first anamorphoser power $m_1$ which are to be used with the embodiment. The $m_2$ servo of FIG. 14 solves Equation (21). An $h_2$ potential applied from terminal 1010 via resistor R-1406 is compared with a $-h_1P_0^2m_1m_2$ potential derived by way of terminal 1003 and potentiometers R-1401, R-1402, R-1403 and R-1404, and the $m_2$ servo, which may include motor M-200 of FIG. 2, adjusts potentiometer R-1403 so as to minimize the servo input signal, providing a shaft output to position pinion 121 in accordance with required second anamorphosers power.

The $\theta$ servo of FIG. 14 solves Equation (10). Potentials proportional to $m_1/m_2$, $m_2/m_1$, $m_1m_2$ and $1/m_1m_2$ are derived in straightforward manner, summed in summing amplifier U-1405, multiplied by $\sin^2 \theta$ by resolvers R-1433 and R-1434 and applied as an input via summing resistor R-1435. Potentials of appropriate polarity proportional to $m_1m_2$ and $1/m_1m_2$ are summed in amplifier U-1407 and applied to the input circuit via resistor R-1432. The potential on terminal 1006 is applied via summing resistance R-1407. The $\theta$ servo adjusts resolvers R-1433 and R-1434 so as to minimize its input signal, thereby providing a shaft output to pinion 119 proportional to the required second anamorphoser angle $\theta$. The $\beta$ servo of FIG. 14 solves Equation (11). Potentials commensurate with $m_2$ and $1/m_2$ are summed with appropriate polarities by amplifier U-1404, multiplied by $\sin 2\theta$ by resolver R-1436 and applied to the $\beta$ servo input circuit via resistor R-1437. Potentials proportional to the other terms of Equation (2) are derived by multiplying the potentials on terminals 1011 and 1013 by $\sin 2\beta$ and by $\cos 2\beta$, respectively, by means of resolvers R-1440 and R-1438, respectively. The $\beta$ servo adjusts resolvers R-1438 and R-1440 so as to minimize its input signal, thereby providing a shaft output proportional to the required first anamorphoser angle to pinion 105. Since servo-motor M-400 is not itself bodily rotated by the $\beta$ pinion 105 in FIG. 2, the shaft input driving pinion 119 should actually be proportional $(\beta+\theta)$ as discussed above, and for this reason pinion 119 is shown in FIG. 14, as being driven by the combined outputs of the $\beta$ and $\theta$ servos.

Referring now to FIG. 15 there is shown in electrical schematic form an exemplary controller for operating a Type V embodiment of the invention wherein both anamorphosers are varied both in angular position and in power, and in which an arbitrary restraint is imposed upon the system. The controller of FIG. 15 may be used to operate apparatus such as that shown in FIG. 7, for example. A manually positionable control knob 1510 is provided, to be set to a position commensurate with the value of system spherical magnification ($P_0$) used. The particular arbitrary restraint imposed upon the system of FIG. 15 is that the powers $m_1$ and $m_2$ of the first and second anamorphosers are constrained to remain equal at all times, or $m_1=m_2$. Shown in FIG. 15 is an $m_1=m_2$ servo which solves Equation (3). A $-h_2$ input potential from terminal 1008 is applied to the input circuit of the $m_1=m_2$ servo via resistor R–1506 to be balanced with an $(h_1P_0^2m_1m_2)$ or $(h_1P_0^2m_1m_2^2)$ potential derived by multiplying the $h_1$ input potential on terminal 1004 by $P_0^2$ by means of potentiometers R–1501 and R–1502, and further multiplying the potential by means of potentiometers R–1503 and R–1504. Since $m_1=m_2$, these terms may be interchanged in the equations used with such a system. The $m_1=m_2$ servo adjusts the positions of potentiometer R–1503 and R–1504 so as to minimize the servo input potential, thereby providing a shaft output proportional to $m_1$ and $m_2$. The $\theta$ servo of FIG. 15 solves the following equation, which may be derived by substituting $m_1=m_2$ into Equation (10):

$$\left(2-m_2^2\frac{1}{m_2^2}\right)\sin\theta = \frac{h_1^2+h_2^2+d^2}{h_1h_2} - m_2^2 - \frac{1}{m_2^2} \quad (17)$$

A potential proportional to the left-hand side of the equation are derived by applying three potentials to summing amplifier U–1508 and by multiplying the potential by $\sin^2\theta$ by means of resolvers R–1516 and R–1517 to provide a potential to be applied to the $\theta$ servo input circuit via summing resistor R–1518. Potentials of appropriate polarity proportional to $m_2^2$ and $1/m_2^2$ are applied via summing resistors R–1519 and R–1520 and the input potential on terminal 1012 is applied via summing resistor R–1531 to make up the right hand side of the equation. The $\theta$ servo operates its output shaft adjusting resolvers R–1516 and R–1517 so as to minimize the servo input signal, providing a shaft output proportional to $\theta$.

The $\beta$ servo of FIG. 15 solves Equation (11). Potentials proportional to $m_2$ and $1/m_2$ are summed with appropriate polarities by amplifier U–1503, and amplifier output is multiplied by $\sin 2\theta$ by resolver R–1523 to provide a potential via summing resistor R–1524 proportional to the quantity on the left hand side of Equation (2). Potentials proportional to the right-hand terms of the equation are provided by modifying the independent variable inputs on terminals 1011 and 1013 by $\sin 2\beta$ and $\cos 2\beta$, respectively, by means of resolvers R–1525 and R–1527, respectively, and these terms are applied to the $\beta$ servo input circuit via summing resistors R–1526 and R–1528, respectively. The $\beta$ servo adjusts resolvers R–1525 and R–1527 so as to minimize servo input signal, providing a shaft output commensurate with the required first anamorphoser angle to drive pinion 105 of FIG. 7.

The $m_1$ and $m_2$ servo shaft output will be proportionally correct to vary the powers of both anamorphosers, but since the anamorphosers are rotatable with respect to each other through the angle $\theta$, either two separate motors must be used as in FIG. 7 (M–100 and M–200), or, if desired, one motor may be used to adjust one anamorphoser directly and to adjust the other anamorphoser through a summing device such as a mechanical differential (not shown) having the angle $\theta$ added as an input from the $\theta$ servo. As motor M–400 of FIG. 7 is shown mounted stationary rather than carried by the first anamorphoser, a mechanical differential (not shown) having a $\beta$ input should be inserted between motor M–400 and pinion 119.

Shown in FIG. 16 in electrical schematic form is an exemplary control which may be utilized with any of systems of the invention to provide a counter-rotation as viewpoint displacement is varied so that horizon or line-at-infinity portions of original and resultant images remain parallel. The counter-rotation necessary is defined as the angle $\rho$. The $\rho$ servo of FIG. 16 solves Equation (13). In FIGS. 11 through 15 there are shown control computers which provide all of the dependent variable or control quantities ($m_1$, $m_2$, $\beta$ and $\theta$) and the system spherical magnification adjustment $P_0$ as shaft positions. Additional potentiometers and resolvers may be mounted to be operated by these shafts to derive potentials as shown in FIG. 16. An $h_2/h_1$ potential from terminals 1007 is divided by $P_0$ by means of potentiometer R–1608 and amplifier U–1602 and combined in summing amplifier U–1603 with a $1/P_0$ potential derived by potentiometer R–1605 and amplifier U–1601. The output of amplifier U–1603 is multiplied by $\cos\rho$ by resolver R–1629 and applied to the $\rho$ servo input circuit. A $d/h_1$ potential from terminal 1016 is divided by $P_0$ by means of potentiometer R–1604 and amplifier U–1609, multiplied by $\sin\rho$ by resolver R–1628 and applied via summing resistor R–1627. These two input potentials may be seen to represent the left-hand side of Equation (13). Potentials proportional to $m_1m_2$ and 1 are summed in amplifier U–1605, multiplied by $\cos^2\theta$ by resolvers R–1620 and R–1621 and applied via R–1624. Potentials proportional to $m_1$ and $m_2$ are summed in amplifier U–1604, multiplied by $\sin^2\theta$ by resolvers R–1622 and R–1623 and applied via summing resistor R–1625. The $\rho$ servo continuously adjusts resolvers R–1628 and R–1629 so as to minimize the servo input, thereby providing an output shaft position proportional to the required counter-rotation angle $\rho$. Pinion 1610 positioned by the $\rho$ servo may be used to rotate the original image in space as viewpoint displacement is varied, such as by axially rotating the entire projection apparatus. In systems where the rotation of the resultant image in space is not important, the $\rho$ servo may rotate the viewing surface or other surface upon which the resultant image is focused. In systems using limited angular fields, the $\rho$ servo may be used to rotate a Dove prism (not shown) in a manner which will be readily apparent to those skilled in the art.

Shown in FIG. 9 in electrical schematic form with certain well-known parts shown in block diagram form is an exemplary apparatus by which the steps of the invention may be practiced to alter the perspective of an image electrically. The apparatus of FIG. 9 may be controlled by any of the above-described controllers, but unless the Type V system controller of FIG. 15 is used, either the $m_1$, $m_2$, $\beta$ or $\theta$ servo should be replaced by a fixed adjustment. An original image represented by arrow 1701 is scanned by a photo-electric transducer shown as comprising a conventional television camera or "pick-up" tube 1702 having horizontal and vertical scanning deflection means 1705 and 1706, which are energized in conventional manner by sawtooth or trapezoidal potentials from horizontal sweep generator 1703 and vertical sweep generator 1704. The camera tube thereby provides an output potential having a waveform representative of the original image, and such potential is amplified in amplifier 1707 and applied in conventional manner between grid and cathode of a conventional cathode ray tube 1708. Tube 1708 is provided with vertical and horizontal deflection means shown as comprising conventional vertical and horizontal deflection coils 1709 and 1710, which coils are excited by the output potentials of the sweep generators. It will be immediately understood by those skilled in the art that if the ratio of the peak-to-peak vertical sweep amplitude of the peak-to-peak horizontal sweep amplitude is the same for both camera tube 1702 and picture tube 1708, that an image having exactly the same proportions as original image 1701 would be formed on the screen of cathode ray tube 1708. However, assume that the entire camera tube, or at least the scanning means of the camera tube are rotated relative to image 1701 through an angle equal to $\beta$ by the output of the $\beta$ servo, so that the "vertical" sweep direction of camera tube 1702 makes an angle $\beta$ with the vertical direction of image 1701. If the peak-to-peak amplitude of the vertical sweep potential applied to picture tube 1708 is now increased or decreased it may be seen that the picture obtained on tube 1708 will be increased or decreased along an axis of the original image corresponding to the $m_1$ axis, so that the picture resulting on the face of tube 1708 will be primitively transformed in precisely the same manner as with an anamorphoser. The relative magnitudes of the camera tube and picture tube vertical sweep are controlled in FIG. 9 by means of the $m_1$ servo and potentiometer R–1701, so that the magnification of the primitive transformation obtained is controlled in accordance with the value of $m_1$ required. The balance of the apparatus of FIG. 17 performs a second primitive transformation at an angle $\theta$ with respect to the first transformation and with a magnification controlled by the $m_2$ servo. Thus it may be seen that the steps of providing controlled amounts of anamorphic magnification in controlled directions may be accomplished electrically as well as optically in practicing the invention. As will be apparent, the resultant image appearing on the face of the second picture tube 1720 may be counter-rotated by rotating either the deflection coils 1721, 1722 through the angle $(\rho+\beta+\theta)$ via pinion 1724, or by rotating the entire picture tube. Since the deflection means 1705, 1706 of camera tube 1702 are rotated through $\beta$ with respect to original image 1701, and the deflection means 1717, 1718 of second camera tube 1714 are rotated through the angle $\theta$ by the $\theta$ servo and pinion 1723, the resultant picture on 1720 must be counter-rotated through $\beta$ and $\theta$ as well as $\rho$. Each of the camera tubes and picture tubes shown may include, of course, accelerating anodes, ion traps and other well-known parts not shown. The sweep potentials may be amplified and shaped by conventional techniques prior to application to the deflection means. It may be noted that as the peak-to-peak amplitude of a sweep potential is varied, that the D.C. or average level of such potential should remain the same, in order that the picture remain centered on the cathode ray tube no matter how much the sweep potential is varied. For this reason, I prefer to A.C.-couple the sweep potentials to the picture tube deflection means. Although I have shown a system wherein picture tube sweep potentials are varied in magnitude and camera tube sweep potentials are maintained uniform, it will be recognized that it is the *relative* amplitudes which determine magnification. Thus in FIG. 9 one could apply the output potentials of the vertical sweep generator directly or uniformly to "vertical" deflection coil 1709 and vary the amplitude of the potential applied to deflection coil 1706 in accordance with $m_1$, if desired. Since such arrangement would cause magnification in an inverse fashion to that of the apparatus shown, the coil 1706 sweep potential in such an arrangement should be varied in accordance with the reciprocal of $m_1$. Those skilled in the art will readily recognize how the $m_1$ servo could be re-connected or an additional servo provided to provide a $(1/m_1)$ shaft output. It should be apparent that in relation to FIG. 17 the designation of certain parts as "vertical" or "horizontal" is entirely arbitrary. However, I do deem it preferable to vary the amplitude of the higher frequency sweep. For example, if horizontal and vertical sweep potentials of the United States commercial television frequencies (15,750 and 60 c.p.s., respectively) are utilized, I prefer to vary the amplitude of the 15,750 cycle horizontal sweep in providing a primitive transformation, since variation of the vertical sweep loses the sweep interlace after a small variation and provides an unsatisfactory picture with gaps between the lines in some cases where the picture is considerably expanded. Such a phenomenon may be cured in some respects by varying each picture tube focus control in accordance with magnification. This could be done, for example, in FIG. 9 by potentiometers (not shown) connected to vary the anode voltages of picture tubes 1708 and 1720 in accordance with the positions of the $m_1$ and $m_2$ servos.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for altering the apparent perspective of an image of an object comprising in combination a pair of anamorphosers coaxially disposed along an optical axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, and means for rendering the value of at least one of said variables dependent upon the value of at least one other of said variables.

2. Apparatus for altering the apparent perspective of an image of an object comprising in combination a pair of variable power anamorphosers coaxially disposed along an optical axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $\theta$ constant at a predetermined oblique angle while changing the values of the others of said control variables, and means for rendering the value of at least one of said variables dependent upon the value of at least one other of said variables.

3. Apparatus for altering the apparent perspective of an image of an object comprising in combination a pair of variable power anamorphosers coaxially disposed along an optical axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $\beta$ constant while changing the values of the others of said control variables, and means for rendering the value of at least one of said variables dependent upon the value of at least one other of said variables.

4. Apparatus for altering the apparent perspective of an image of an object comprising in combination a pair of anamorphosers coaxially disposed along an optical axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $m_2$ constant while changing the values of the others of said control variables, and means for rendering the value of at least one of said variables dependent upon the value of at least one other of said variables.

5. Apparatus for altering the apparent perspective of an image of an object comprising in combination a pair of anamorphosers coaxially disposed along an optical axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $m_1$ constant while changing the values of the others of said control variables, and means for rendering the value of at least one of said variables dependent upon the value of at least one other of said variables.

6. Apparatus for altering the apparent perspective of an image of an object comprising in combination a pair of variable power anamorphosers coaxially disposed along an optical axis, each of said anamorphosers being rotatable about said axis, and computer-control motor means for controlling three of said powers and the axial rotations of said anamorphosers, said fourth one of said powers and axial rotations of said anamorphosers being a predetermined function of at least one of said controlled three of the powers and axial rotations of said anamorphosers.

7. Apparatus for altering the apparent perspective of an image of an object having the appearance of an area as viewed at a first viewpoint located at a first altitude and first lateral position to provide an image having the appearance of said area as viewed at a second viewpoint located at a selected altitude and a selected lateral position comprising in combination a pair of means for anamorphically magnifying said image, each of said means being coaxially disposed along an optical axis and being variable in anamorphic magnifying power and in angular rotation about said axis to provide four degrees of freedom, and means for controlling said powers and rotations, said last-named means incorporating an arbitrary restraint to provide apparatus having three degrees of freedom.

8. Apparatus for altering the apparent perspective of an image of an object comprising in combination two anamorphosers coaxially disposed along an optical axis, the powers of said anamorphosers and the angular orientation of each of said anamorphosers being allowable variables, means for altering three of said variables while simultaneously constraining the other of said variables to values which are a predetermined function of at least one of said three variables being altered.

9. Apparatus for altering the apparent perspective of an image comprising in combination two variable power anamorphosers each coaxially mounted on and mutually independently rotatable about an optical axis, and control means for varying the powers and rotations of said anamorphosers while simultaneously imposing a restraint upon the variation of one of the abovementioned variables.

10. Apparatus according to claim 9 in which said control means varies the powers and rotations of said anamorphosers while maintaining fixed the ratio between the powers of said anamorphosers.

11. Apparatus for altering the perspective of an image of an object comprising in combination first means coaxially disposed along an optical axis for providing a first primitive transformation of said image at a first angle and with a first power, second means coaxially disposed along said optical axis for providing a second primitive transformation of said image at a second angle and with a second power, said angles and said powers comprising four variables; and computer control means interconnecting said first and second means to control three of said four variables, said fourth one of said variables being a predetermined function of at least one of said three controlled variables, and third means for axially rotating said object with respect to said image.

12. Apparatus for altering the apparent perspective of an image of an object to provide a resultant image having the appearance of said object viewed from a displaced viewpoint comprising in combination, a pair of anamorphosers coaxially disposed along an optical axis, said optical axis being fixedly spaced relative to said object, said pair of anamorphosers having four possible control variables: $m_1$, the power of a first of said anamorphosers, $m_2$, the power of a second of said anamorphosers, $\beta$, the angle between the direction of anamorphic power of said first of said first of said anamorphosers and a reference axis, and $\theta$, the angle between the direction of anamorphic power of said first of said anamorphosers and the direction of anamorphic power of said second of said anamorphosers, computer controlled motor means for varying at least one of said control variables $m_1$ and $m_2$ and at least one of said control variables $\beta$ and $\theta$ during the operation of said apparatus, said computer controlled motor means rendering the value of at least one of said variables dependent upon the value of at least one other of said variables.

13. Apparatus for altering the apparent perspective of an image of an object to provide a resultant image having the appearance of said object viewed from a displaced viewpoint comprising in combination, a pair of variable power anamorphosers coaxially disposed along an optical axis, said optical axis being fixedly spaced relative to said object, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $\theta$ constant at a predetermined angle while the values of the others of said control variables change, and means for rendering the value of at least one of said variables dependent upon the value of at least one other of said variables.

14. Apparatus for altering the apparent perspective of an image of an object to provide a resultant image having the appearance of said object viewed from a displaced viewpoint comprising in combination, a pair of variable power anamorphosers coaxially disposed along an optical axis, said optical axis being fixedly spaced relative to said object, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable, $\beta$, constant while changing the values of the others of said control variables, and means for rendering the value of at least one of said variables dependent upon the value of at least one other of said variables.

15. Apparatus for altering the apparent perspective of an image of an object to provide a resultant image having the appearance of said object viewed from a displaced viewpoint comprising in combination, a pair of anamorphosers coaxially disposed along an optical axis, said optical axis being fixedly spaced relative to said object, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $m_2$ constant while changing the values of the others of said control variables, and means for rendering the value of at least one of said variables dependent upon the value of at least one other of said variables.

16. Apparatus for altering the apparent perspective of an image of an object to provide a resultant image having the appearance of said object viewed from a displaced viewpoint comprising in combination, a pair of anamorphosers coaxially disposed along an optical axis, said optical axis being fixedly spaced relative to said object, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $m_1$ constant while changing the values of the others of said control variables, and means for rendering the value of at least one of said variables dependent upon the value of at least one other of said variables.

17. Apparatus for altering the apparent perspective of an image of an object to provide a resultant image having the appearance of said object viewed from a displaced viewpoint comprising in combination, a pair of variable power anamorphosers coaxially disposed along an optical axis, said optical axis being fixedly spaced relative to said object, each of said anamorphosers being rotatable about said axis, said pair of anamorphosers having four control variables: $m_1$, the power of a first of said anamorphosers, $m_2$, the power of a second of said anamorphosers, $\beta$, the angle between the direction of anamorphic power of said first of said anamorphosers and a reference axis, and $\theta$, the angle between the direction of anamorphic power of said first of said anamorphosers and the direction of anamorphic power of said second of said anamorphosers, means for maintaining the value of said control variable $m_1$ equal to the value of said control variable $m_2$ while changing the values of the control variables $m_1$, $m_2$, $\beta$, and $\theta$, and means for rendering the value of at least one of said variables dependent upon the value of at least one other of said variables.

18. Apparatus according to claim 12 having means for providing relative axial rotation between said object and said optical axis.

19. Apparatus according to claim 13 having means for providing relative axial rotation between said object and said optical axis.

20. Apparatus according to claim 14 having means for providing relative axial rotation between said object and said optical axis.

21. Apparatus according to claim 15 having means for providing relative axial rotation between said object and said optical axis.

22. Apparatus according to claim 16 having means for providing relative axial rotation between said object and said optical axis.

23. Apparatus according to claim 17 having means for providing relative axial rotation between said object and said optical axis.

24. Apparatus for altering the apparent perspective of an image of an object to provide a resultant image having the appearance of said object viewed from a displaced viewpoint comprising in combination, first and second variable power anamorphosers coaxially disposed along an optical axis, the powers of said anamorphosers being independently variable with respect to each other, both of said anamorphosers having variable power and being axially rotatable, the power of said first anamorphoser, $m_1$, the power of said second anamorphoser, $m_2$, the angle between the direction of anamorphic power of said first anamorphoser and a reference axis, $\beta_1$ and the angle between the directions of anamorphic power of said anamorphosers, $\theta$, constituting control variables, means for rendering the value of at least one of said control variables dependent upon the value of at least one of the other of said control variables, and an image forming surface located within a plane fixed relative to said optical axis.

25. Apparatus according to claim 24 having means for providing relative axial rotation between said object and said image-forming surface.

References Cited by the Examiner

UNITED STATES PATENTS

| | | | |
|---|---|---|---|
| 2,337,363 | 12/1943 | Ames. | |
| 2,419,939 | 5/1947 | Ames. | |
| 2,510,202 | 6/1950 | Wilkinson | 96—46 |
| 2,798,411 | 7/1957 | Coleman | 88—57 |
| 2,903,801 | 9/1959 | Stimson | 35—26 |
| 2,938,279 | 5/1960 | Hemstreet et al. | 88—57 X |

FREDERICK M. STRADER, *Primary Examiner.*

JOHN K. CORBIN, *Examiner.*